(12) United States Patent
Legault et al.

(10) Patent No.: US 8,131,533 B2
(45) Date of Patent: *Mar. 6, 2012

(54) REPORTING MODEL GENERATION WITHIN A MULTIDIMENSIONAL ENTERPRISE SOFTWARE SYSTEM

(75) Inventors: Thomas Legault, Gatineau (CA); Dominique Roy, Gatineau (CA)

(73) Assignee: International Business Machines Corporation, Armonk, NY (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/350,838

(22) Filed: Jan. 8, 2009

(65) Prior Publication Data

US 2009/0164508 A1  Jun. 25, 2009

Related U.S. Application Data

(63) Continuation of application No. 10/999,807, filed on Nov. 30, 2004, now Pat. No. 7,505,888.

(51) Int. Cl.
  *G06F 9/45* (2006.01)
  *G06F 17/30* (2006.01)
(52) U.S. Cl. .......................................... 703/22; 707/803
(58) Field of Classification Search .................. 703/22; 707/803
  See application file for complete search history.

(56) References Cited

U.S. PATENT DOCUMENTS

| | | | |
|---|---|---|---|
| 5,379,419 A | 1/1995 | Heffernan et al. |
| 5,692,181 A | 11/1997 | Anand et al. |
| 5,734,887 A | 3/1998 | Kingberg et al. |
| 5,864,857 A | 1/1999 | Ohata et al. |
| 5,870,746 A | 2/1999 | Knutson et al. |
| 5,918,232 A | 6/1999 | Pouschine et al. |
| 5,978,788 A | 11/1999 | Castelli et al. |
| 5,978,796 A | 11/1999 | Malloy et al. |
| 6,134,541 A | 10/2000 | Castelli et al. |
| 6,205,447 B1 | 3/2001 | Malloy |
| 6,366,922 B1 | 4/2002 | Althoff |
| 6,385,604 B1 | 5/2002 | Bakalash et al. |
| 6,418,427 B1 | 7/2002 | Egilsson et al. |
| 6,477,536 B1 | 11/2002 | Pasumansky et al. |

(Continued)

FOREIGN PATENT DOCUMENTS

WO WO 97/46958 12/1997

(Continued)

OTHER PUBLICATIONS

Office Action from U.S. Appl. No. 12/185,574 dated Nov. 8, 2010 (8 pages).

(Continued)

*Primary Examiner* — Paul Rodriguez
*Assistant Examiner* — Eun Kim
(74) *Attorney, Agent, or Firm* — Shumaker & Sieffert, P.A.

(57) ABSTRACT

Techniques are described for automatically generating a reporting model based on a relational database storing multidimensional data in accordance with a relational database schema. A model generator may, for example, produce a base reporting model from the database schema, and subsequently generate a user reporting model by importing the base reporting model. The model generator updates the user reporting model in response to modifications requested by a user, and maintains an activity log to record the modifications. The model generator regenerates the base reporting model and the user reporting model in the event the database schema changes, and reapplies the modifications from the activity log to the user reporting model to automatically update the user reporting model. The database schema may be a relational star schema as described herein.

20 Claims, 21 Drawing Sheets

U.S. PATENT DOCUMENTS

| | | | |
|---|---|---|---|
| 6,484,179 B1 | 11/2002 | Roccaforte | |
| 6,510,420 B1 | 1/2003 | Cessna et al. | |
| 6,594,672 B1 | 7/2003 | Lampson et al. | |
| 6,609,123 B1 | 8/2003 | Cazemier et al. | |
| 6,636,870 B2 | 10/2003 | Roccaforte | |
| 6,691,102 B2 | 2/2004 | Chang et al. | |
| 6,707,454 B1 | 3/2004 | Barg et al. | |
| 6,714,940 B2 | 3/2004 | Kelkar | |
| 6,768,986 B2 | 7/2004 | Cras et al. | |
| 6,768,995 B2 | 7/2004 | Thier et al. | |
| 6,801,921 B2 | 10/2004 | Tsuchida et al. | |
| 6,829,621 B2 | 12/2004 | Keller | |
| 6,965,903 B1 | 11/2005 | Agarwal et al. | |
| 7,080,084 B2 | 7/2006 | Yoshimura et al. | |
| 7,089,266 B2 | 8/2006 | Stolte et al. | |
| 7,171,427 B2 | 1/2007 | Witkowski et al. | |
| 7,181,440 B2 | 2/2007 | Cras et al. | |
| 7,181,450 B2 | 2/2007 | Malloy et al. | |
| 7,287,218 B1 | 10/2007 | Knotz et al. | |
| 7,505,888 B2 | 3/2009 | Legault et al. | |
| 2002/0038306 A1 | 3/2002 | Griffin et al. | |
| 2002/0073088 A1 | 6/2002 | Beckmann et al. | |
| 2002/0078018 A1 | 6/2002 | Tse et al. | |
| 2002/0087516 A1 | 7/2002 | Cras et al. | |
| 2002/0087686 A1 | 7/2002 | Cronk | |
| 2002/0129003 A1 | 9/2002 | Bakalash et al. | |
| 2003/0004959 A1 | 1/2003 | Kotsis et al. | |
| 2003/0101176 A1 | 5/2003 | Kelkar | |
| 2003/0182300 A1 | 9/2003 | Anjur et al. | |
| 2003/0187830 A1 | 10/2003 | Chang et al. | |
| 2003/0208506 A1 | 11/2003 | Greenfield et al. | |
| 2004/0034616 A1 | 2/2004 | Witkowski et al. | |
| 2004/0059724 A1 | 3/2004 | Petculescu et al. | |
| 2004/0064349 A1 | 4/2004 | Humenansky et al. | |
| 2004/0064433 A1 | 4/2004 | Thier et al. | |
| 2004/0117379 A1 | 6/2004 | Khatchatrian et al. | |
| 2004/0122646 A1 | 6/2004 | Colossi et al. | |
| 2004/0122844 A1 | 6/2004 | Malloy et al. | |
| 2004/0139061 A1 | 7/2004 | Colossi et al. | |
| 2004/0181519 A1 | 9/2004 | Anwar | |
| 2004/0193633 A1 | 9/2004 | Petculescu et al. | |
| 2004/0236738 A1 | 11/2004 | Thier et al. | |
| 2004/0243593 A1 | 12/2004 | Stolte et al. | |
| 2005/0015360 A1 | 1/2005 | Cras et al. | |
| 2005/0060300 A1 | 3/2005 | Stolte et al. | |
| 2005/0149550 A1 | 7/2005 | Berger et al. | |
| 2006/0010159 A1 | 1/2006 | Mirchandani et al. | |
| 2006/0020619 A1 | 1/2006 | Netz et al. | |
| 2006/0116975 A1 | 6/2006 | Gould et al. | |
| 2006/0116976 A1 | 6/2006 | Legault et al. | |
| 2006/0117057 A1 | 6/2006 | Legault et al. | |
| 2007/0130116 A1 | 6/2007 | Cras et al. | |
| 2008/0307357 A1 | 12/2008 | Gould et al. | |

FOREIGN PATENT DOCUMENTS

| | | |
|---|---|---|
| WO | WO 01/29690 A2 | 4/2001 |

OTHER PUBLICATIONS

Amendment from U.S. Appl. No. 12/185,574 dated Feb. 7, 2011 (12 pages).

Search Report and Written Opinion from corresponding PCT Application Serial No. PCT/IB2005/004137 mailed Jul. 19, 2006 (12 pages).

"Cognos® Management Series Planning, Introduction to the Contributor Database," 18 pages (2003).

International Preliminary Report on Patentability from corresponding PCT Application Serial No. PCT/IB2005/004137 mailed Jun. 14, 2007 (7 pages).

Supplementary European Search Report from corresponding Application Serial No. EP 05 85 0813 mailed Nov. 6, 2007 (6 pages).

"Cognos® Enterprise Planning Series Cognos Planning, Administration Guide," Chapter 20: Administration Extensions, pp. 181-192 (2004).

"Reporting from the Contributor Data Structure," 35 pages (Oct. 21, 2002).

Colossi, N. et al., "Relational Extensions for OLAP," IBM Systems Journal, vol. 41. No. 4, © 2002, pp. 714-731.

Sapia, C. et al., "Extending the E/R Model for the Multidimensional Paradigm," Lecture Notes in Computer Science, vol. 1552, Springer-Verlag, Berlin/Heidelberg, © 1999, pp. 105-116.

Torben Bach Pedersen et al., "Multidimensional Database Technology", Computer, vol. 34, No. 12, Dec. 2001 (pp. 40-46).

Bernhard Thalheim, "Component Construction of Database Schemes", ER 2002, LNCS 2503, Springer-Verlag, Berlin, Germany, © 2002, pp. 20-34.

Erhard Rahm et al., "A Survey of Approaches to Automatic Schema Matching", *The VLDB Journal*, vol. 10, © 2001, pp. 334-350.

Pedersen, Torben B., et al., "A Foundation for Capturing and Querying Complex Multidimensional Data," Information Systems, vol. 26, © 2001, pp. 383-423.

Malinowski, Elzbieta, et al., "Representing Spatiality in a Conceptual Multidimensional Model," GIS '04, Washington, D.C., Nov. 12-13, 2004, pp. 12-21.

Kernighan, Brian W., et al., "The C Programming Language," Prentice-Hall, Inc., Englewood Cliffs, NJ, © 1978, pp. 39-42 and 109.

Notice of Appeal and Pre-Appeal Brief Request for Review for U.S. Appl. No. 12/185,574, dated May 24, 2011, 6 pp.

European Communication from related Application No. 05 850 757.5-1225 dated May 25, 2011 (6 pages).

Final Office Action from related application U.S. Appl. No. 12/185,574 dated Feb. 25, 2011 (12 pages).

Responsive Amendment filed in related U.S. Appl. No. 12/185,574 on Apr. 20, 2011 (14 pages).

Advisory Action from related U.S. Appl. No. 12/185,574 dated Apr. 29, 2011 (3 pages).

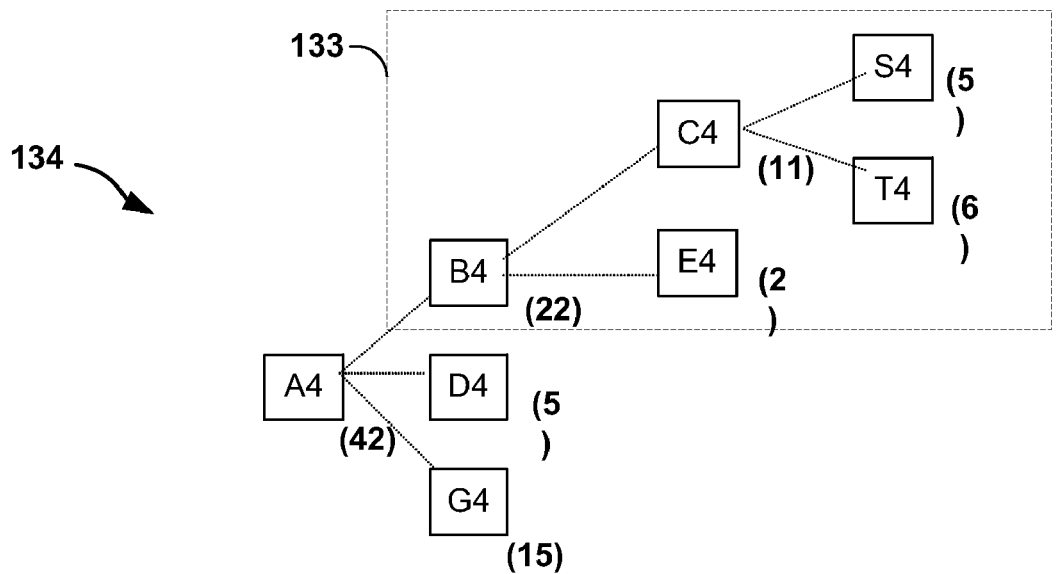
FIG. 10A
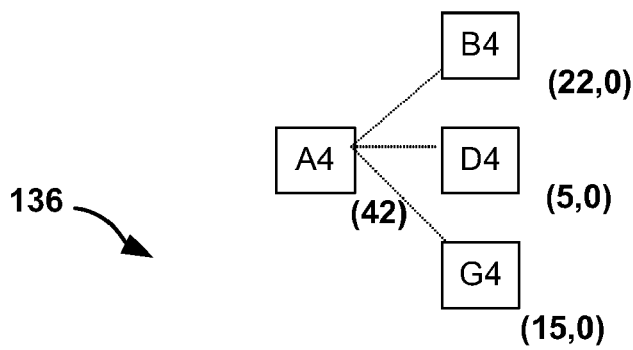
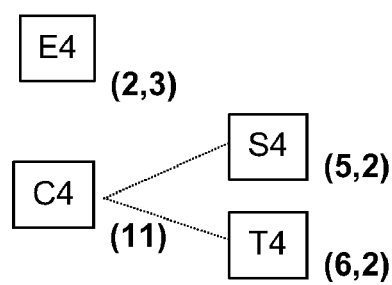
FIG. 10B

| iid_employees | iid_elist | iid_versions | text_grade | float_grade | date_grade | text_base_salary | float_base_salary |
|---|---|---|---|---|---|---|---|
| 48 | 7 | 2 | G Grade | <NULL> | <NULL> | 84,926 | 84926 |
| 48 | 7 | 3 | G Grade | <NULL> | <NULL> | 84,926 | 84926 |
| 48 | 47 | 2 | <NULL> | <NULL> | <NULL> | <NULL> | <NULL> |
| 48 | 47 | 3 | <NULL> | <NULL> | <NULL> | <NULL> | <NULL> |
| 48 | 50 | 2 | <NULL> | <NULL> | <NULL> | 84,926 | 84926 |
| 48 | 50 | 3 | <NULL> | <NULL> | <NULL> | 84,926 | 84926 |
| 48 | 51 | 2 | <NULL> | <NULL> | <NULL> | 84,926 | 84926 |
| 48 | 51 | 3 | <NULL> | <NULL> | <NULL> | 84,926 | 84926 |
| 48 | 52 | 2 | <NULL> | <NULL> | <NULL> | <NULL> | <NULL> |
| 48 | 52 | 3 | <NULL> | <NULL> | <NULL> | <NULL> | <NULL> |
| 48 | 53 | 2 | <NULL> | <NULL> | <NULL> | <NULL> | <NULL> |
| 48 | 53 | 3 | <NULL> | <NULL> | <NULL> | <NULL> | <NULL> |
| 48 | 54 | 2 | <NULL> | <NULL> | <NULL> | <NULL> | <NULL> |
| 48 | 54 | 3 | <NULL> | <NULL> | <NULL> | <NULL> | <NULL> |
| 49 | 7 | 2 | I Grade | <NULL> | <NULL> | 223,258 | 223258 |
| 49 | 7 | 3 | I Grade | <NULL> | <NULL> | 223,258 | 223258 |
| 49 | 47 | 2 | <NULL> | <NULL> | <NULL> | <NULL> | <NULL> |

FIG. 11

Published Columns — 210

| D-List Item Name | Column Name | Column Data Type |
|---|---|---|
| Asset Purchase Number | asset_purchase_num | Integer |
| Asset Purchase Details | asset_purchase_det | Integer |
| A1 | text_a1 | Text |
| A1 | a1 | Float |
| A1 | date_a1 | Date |
| A2 | text_a2 | Text |
| A2 | a2 | Float |
| A2 | date_a2 | Date |
| A | text_a | Text |
| A | a | Float |
| A | date_a | Date |
| B1 | text_b1 | Text |
| B1 | b1 | Float |
| B1 | date_b1 | Date |
| B2 | text_b2 | Text |
| B2 | b2 | Float |
| B2 | date_b2 | Date |
| B | text_b | Text |
| B | b | Float |
| B | date_b | Date |
| Total | text_total | Text |
| Total | total | Float |
| Total | date_total | Date |
| Versions | versions | Integer |

FIG. 17 ial database. In other words, the multidimensional nature of the enterprise software system is often incompatible with the two-dimensional relational format utilized by the reporting software.

REPORTING MODEL GENERATION WITHIN A MULTIDIMENSIONAL ENTERPRISE SOFTWARE SYSTEM

This application is a continuation of and claims priority to U.S. patent application Ser. No. 10/999,807, filed Nov. 30, 2004, now U.S. Pat. No. 7,505,888, issued Mar. 17, 2009, the entire content of which is incorporated herein by reference.

TECHNICAL FIELD

The invention relates to software systems and, in particular, to computing environments for enterprise business planning.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

In many situations, a user may wish to publish data from one enterprise software system to other third party software tools. As one example, the user may wish to publish data from a financial planning system to reporting and analysis software. However, many enterprise software systems, such as financial planning systems, store data in multidimensional data cubes. It is often difficult to publish data from the multidimensional environment of the enterprise software system to reporting software, which typically stores data in a relational database. In other words, the multidimensional nature of the enterprise software system is often incompatible with the two-dimensional relational format utilized by the reporting software.

For example, multidimensional data cubes consist of multiple dimensions and measures. In general, a dimension is a structural attribute of a data cube that is an organized hierarchy of categories. For example, a geography dimension might include levels for country, region, state or province, and city. Measures represent the data values along the cells of the dimension.

In some situations measures within a multidimensional data cube vary with data type and formatting along the dimensions of the data cube. For example, a defined measure may vary from a string data type for certain cells along a dimension to a numerical data type for different cells depending on the different dimensions of the data cube. Consequently, it is often difficult to publish the data cube and correctly represent the format and data type of the measures.

As a result, many conventional enterprise systems published the multidimensional data in a simple text format. However, this prevents the reporting software from being able to perform further calculations and analysis on the published data.

SUMMARY

In general, the invention is directed to techniques for publishing multidimensional data from an enterprise software system. The techniques may, for example, publish multidimensional data to a relational database schema that is optimized for reporting purposes. For example, the database schema may be a relational star schema as described herein.

The techniques may include processes for automatically producing the database schema based on the organization of the multidimensional data cube, and for populating the database schema with data from the data cube. The database schema may be used for reporting the multidimensional enterprise data, or may serve as a staging area to move the enterprise data toward a data warehouse within an enterprise software system.

The described techniques may further include a process for automatically generating a reporting model from the database schema. The reporting model serves as a framework from which reports can easily be created for accessing and presenting the multidimensional enterprise data published to the database schema. Further, techniques are described for automatically regenerating the reporting model from the database schema, and synchronizing the regenerated reporting model to include any user changes applied to the previous reporting model.

In one embodiment, a computer-implemented system comprises a relational database storing multidimensional data in accordance with a relational database schema. The system further comprises a model generator that produces a reporting model based on the database schema, and a reporting tool that outputs a report to present the multidimensional data in accordance with the reporting model.

In another embodiment, a computer-implemented method comprises storing multidimensional data in a relational database in accordance with a relational database schema, generating a reporting model based on the database schema, and output a report with a reporting tool to present the multidimensional data in accordance with the reporting model.

In another embodiment, a computer-readable medium comprises instructions. The instructions cause a programmable processor to generate a base reporting model based on a database schema that stores multidimensional data in a relational database, and generate a user reporting model from the base reporting model. The instructions further cause the processor to update the user reporting model in response to modifications requested by a user, maintain an activity log to record the requested modifications to the user reporting model, regenerate the base reporting model in the event the database schema changes, and reapply the modifications from the activity log to the user reporting model to automatically update the user reporting model.

The techniques may provide one or more advantages. For example, the techniques provide for the automatic creation of a database schema, such as a relational star schema, that can accept heterogeneous data types and heterogeneous formats that may be utilized within the data cube. Moreover, the schema may automatically be configured to store the metadata required for interpreting the contained enterprise data. In this way, other software applications, such as reporting tools, may readily utilize the database schema and the enterprise data contained therein for analysis and reporting.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 10A shows an example of a non-simple summary hierarchy including a sub-hierarchy of a non-simple summary, and FIG. 10B depicts the resulting simple summary hierarchy produced by schema generator during publication for storage within the simple sums table.

FIG. 11 shows an example of a fact table created for one data cube by the process shown in FIG. 6.

FIG. 17 is a screen illustration of an example user interface produced by the schema generator.

DETAILED DESCRIPTION

Figure 1:
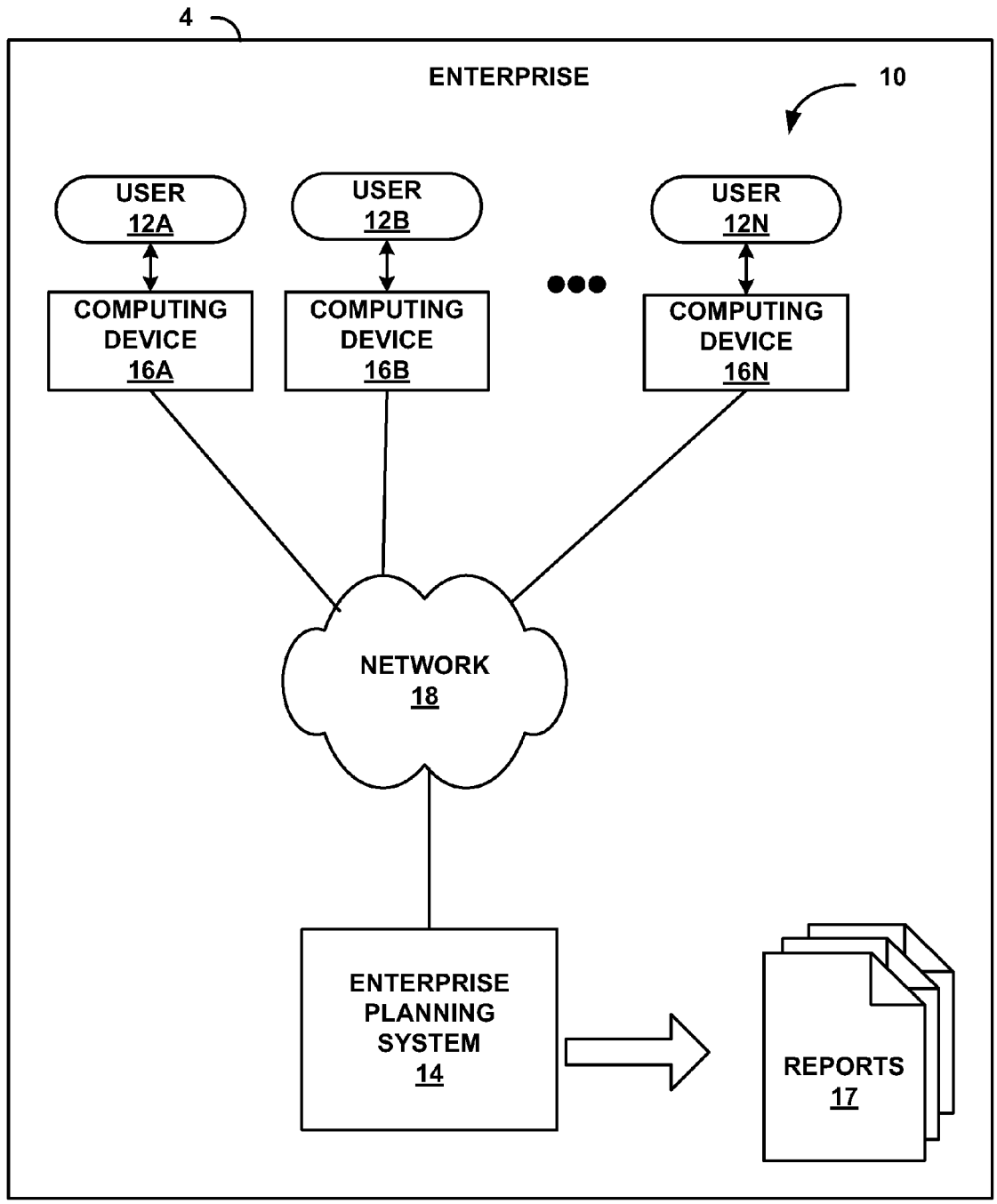
FIG. 1 is a block diagram illustrating an example computing environment in which a plurality of users interact with an enterprise planning system.

FIG. 1 is a block diagram illustrating an example enterprise 4 having a computing environment 10 in which a plurality of users 12A-12N (collectively, "users 12") interact with an enterprise planning system 14. In the system shown in FIG. 1, enterprise system 14 is communicatively coupled to a number of computing devices 16A-16E (collectively, "computing devices 16") by a network 18. Users 12 interact with their respective computing devices 16 to access enterprise planning system 14.

For exemplary purposes, the invention is described in reference to an enterprise planning system, such as an enterprise financial or budget planning system. The techniques described herein may be readily applied to other software systems that utilize multidimensional data, including other large-scale enterprise software systems. Examples of other enterprise software systems include order management systems, inventory management systems, sales force management systems, business intelligent tools, enterprise reporting tools, project and resource management systems, and other enterprise software systems.

In general, enterprise planning system 14 enables and automates the reconciliation of top-down targets with detailed bottom-up forecasts for an enterprise. Enterprise planning system 14 implements and manages an enterprise planning process, which generally consists of three functions: (1) modeling, (2) contribution and (3) reconciliation.

Initially, high-level enterprise managers or executives, referred to as analysts, define organizational targets and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts then specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users 12 to each node, such as managers, supervisors, sales representatives, lab managers, or the like, that are responsible for enterprise planning for the cost center corresponding to the node. Each enterprise user 12 may be designated as a contributor that provides planning data to enterprise planning system 14, a reviewer that accepts or rejects contributions from the contributors, or both. The contributors and reviewers may be authorized users within the enterprise or within other entities coupled to network 18, such as suppliers or customers.

The enterprise users 12 that are designated as contributors interact with enterprise planning system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning system 14 automates the reconciliation of the forecast data with the corporate target data provided by the analysts. In particular, enterprise planning system 14 operates in accordance with a defined model, i.e., the enterprise planning model created by the analysts, to provide a hierarchical planning process having multiple reconciliation levels. As each of the contributors provides his or her contribution data (referred to generally, as "enterprise data"), enterprise planning system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning system 14 may provide more accurate enterprise planning than with conventional techniques. For example, enterprise planning system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning system 14 can aggregate contribution data in real-time, all users 12 can be presented with an accurate, up-to-date view of the numbers. Further, the architecture of enterprise planning system 14 can readily scale to thousands of users, and may be designed around best planning practices. In addition, the techniques enable high participation by enterprise users 12, i.e., the contributors and reviewers, allowing accurate planning cycles to be reduced.

Enterprise users 12 may use a variety of computing devices to interact with enterprise planning system 14 via network 18. For example, an enterprise user may interact with enterprise planning system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning system 14 via a local area network, or may remotely access enterprise planning system 14 via a virtual private network, remote dial-up, or similar remote access communication mechanism.

Enterprise planning system 14 may utilize a "cut-down" process by which the multidimensional data store is "sliced" for each user 12 in accordance with the defined enterprise model. During this process, enterprise planning system 14 identifies areas of the defined model to which users 12 are assigned, either as contributors or reviewers, and "slices" the data store based on the assignments. When a given user 12 logs in and proceeds with an enterprise planning activity, enterprise planning system 14 communicates the respective data slice to the respective computing device 16 for display to the user via the extended spreadsheet application. In this fashion, enterprise planning system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, enterprise planning system 14 automatically produces a database schema for publishing or otherwise outputting the multidimensional data to a relational database. Enterprise planning system 14 produces the database schema based on the organization of the multidimensional enterprise planning data being published. As described in further detail below, the database schema may be a relational star schema that is optimized to store the multidimensional data in a relational form.

Upon creating the database schema, enterprise planning system 14 populates the database schema with the multidimensional planning data. Other software applications may then utilize the published planning data. For example, the database schema may serve as a staging area to move the enterprise data to a data warehouse.

As another example, the database schema may be used for generating reports 17 based on the multidimensional enterprise data. As described further, enterprise planning system 14 may automatically generate a reporting model from the database schema. The reporting model serves as a framework from which reports 17 may easily be produced from the multidimensional enterprise data published to the database schema. Enterprise planning system 14 automatically regenerates the reporting model from the database schema, and synchronizes the regenerated reporting model to include any user changes applied to the previous reporting model.

Figure 2:
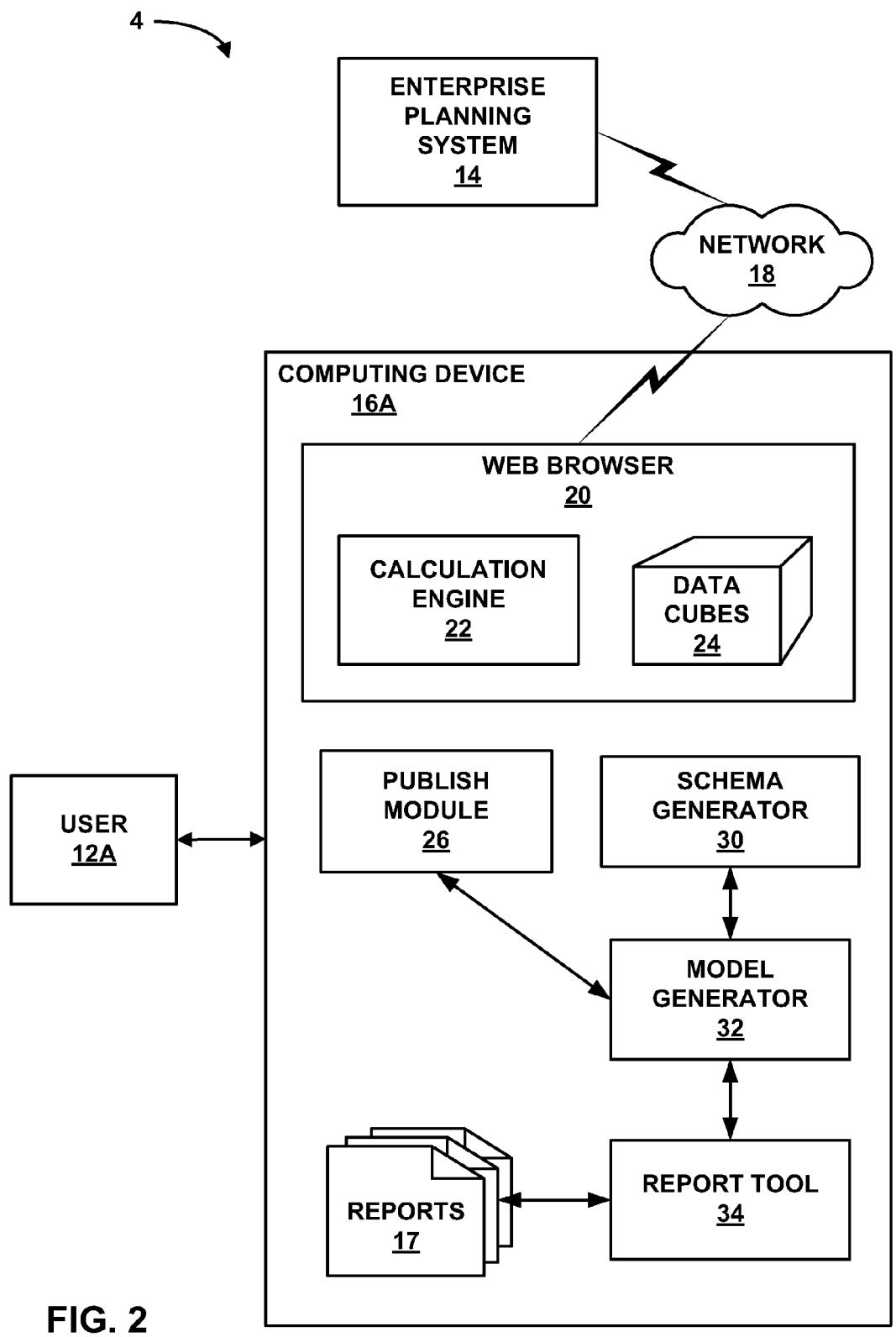
FIG. 2 is a block diagram illustrating one embodiment of a remote computing device for interacting with the enterprise planning system of FIG. 1.

FIG. 2 is a block diagram illustrating one embodiment of a computing device 16A, including various software modules executing thereon, when operated by a user 12A, such as a contributor or a reviewer. In the exemplary embodiment, computing device 16A includes web browser 20, calculation engine 22, and one or more data cubes 24. In addition, computing device 16A includes publish module 26, schema generator 30, model generator 32, and report tool 34.

In one embodiment, calculation engine 22 comprises a forward calculation engine 22 wrapped in an Active X object built in an array-based language. In the example of enterprise planning, user 12A may interact with web browser 20 to enter and manipulate budget or forecast data. Data cube 24 contains planning data, which may include top-down targets and bottom-up contribution data. Calculation engine 22 and data cube 24 allow all calculations for an enterprise planning session to be performed locally by computing device 16A. Therefore, in this example, a contributor can modify his or her respective contribution data, and perform calculations necessary for the enterprise planning process without necessarily accessing enterprise planning system 14. In other words, calculation engine 22 and data cube 24 may be maintained locally (e.g., as ActiveX components) via computing device 16A.

User 12A may save the planning data locally, and submit the planning data to enterprise planning system 14 for aggregation with the planning data from other users. Enterprise planning system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets. In other embodiments, calculation engine 22 and data cube 24 may be maintained only at enterprise planning system 14 and installed locally upon computing devices 16.

In general, publish module 26 represents a software module for publishing multidimensional data from one or more data cubes 24. A user, such as user 12A, interacts with publish module 26 to initiate a publish process. During this process, user 12A selects one or more dimensions from one or more data cubes 24. Schema generator 30 automatically produces a database schema to store the selected multidimensional data in relational database form. In particular, schema generator 30 analyzes data cubes 24 and the dimensions that compose the cubes to determine which relational tables need to be created within the database schema.

Model generator 32 automatically generates a reporting model based on the database schema. Reporting tool 34 outputs reports 17 to present the published multidimensional data in accordance with the reporting model.

Figure 3:
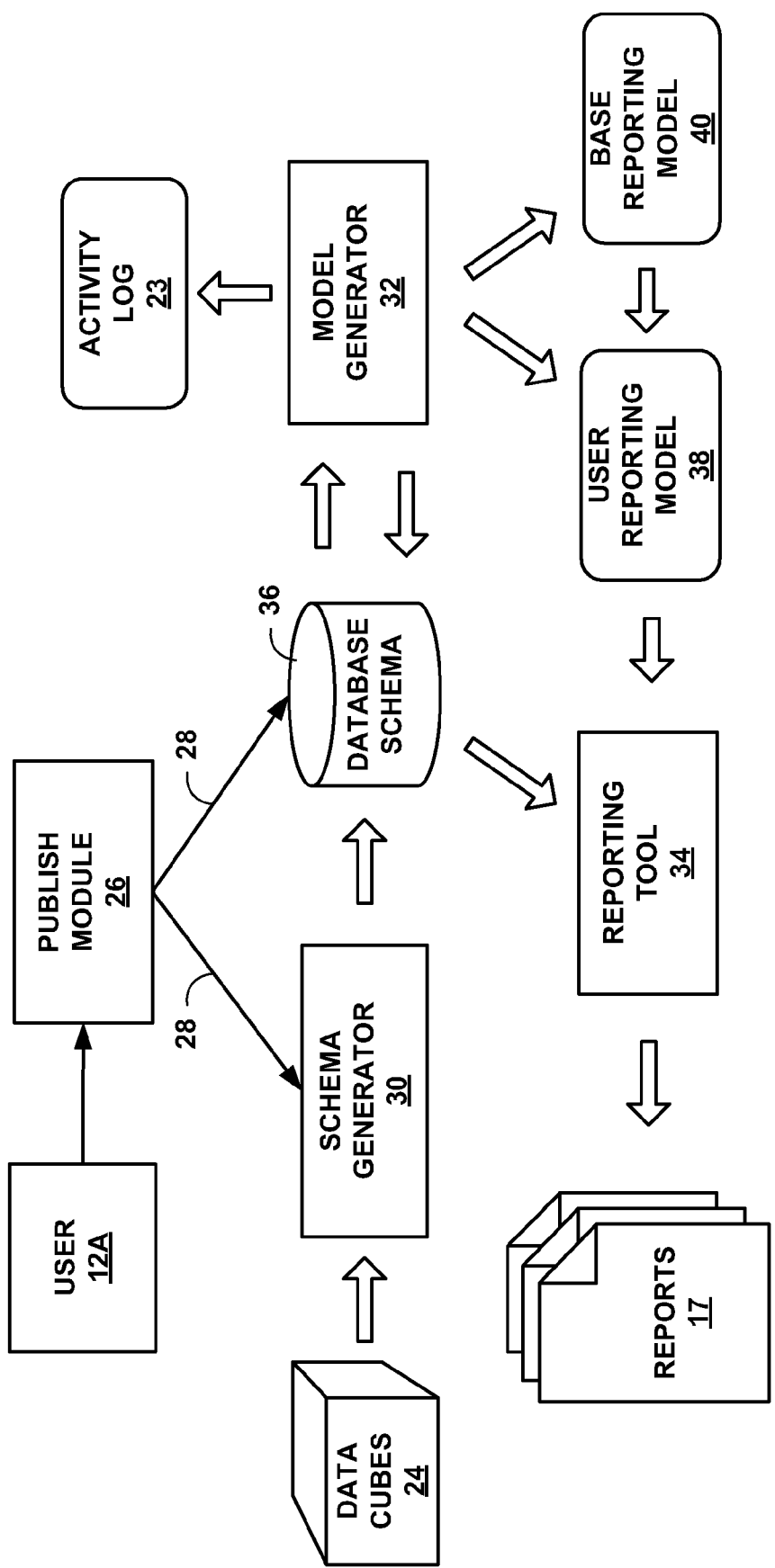
FIG. 3 is a block diagram that illustrates certain software components of the remote computing device in further detail.

FIG. 3 is a block diagram that illustrates certain software components of the remote computing device in further detail. As illustrated in FIG. 3, publish module 26 represents a software module by which a user, such as user 12A, publishes multidimensional data from one or more data cubes 24. In particular, schema generator 30 automatically produces a database schema 36 to store the multidimensional data in relational database form.

In general, database schema stores two forms of metadata. The first type includes metadata pertaining to data cubes 24. In particular, the metadata defines the data types and formats for measures within data cubes 24. As a result, database schema 36 supports heterogeneous data types and heterogeneous formats. The second type of metadata stored by database schema 36 is metadata that describes the schema itself. This second type of metadata may allow for enhanced interpretation of database schema 36 by a developer or an automated tool. As one example, user 12A may interact with model generator 32 to subsequently modify the metadata to add members or levels to the published dimensions, change security settings applied to the published multidimensional data or perform other modifications.

To allow calculations to be performed on the heterogeneous data, schema generator 30 may generate database schema 36 to store all of the data types represented by each measure within data cubes 24. For example, schema generator 30 may create multiple columns for each measure. As one example, schema generator 30 may create three columns for each measure: a first column to store float values, a second column to store date values, and a third column to store text values for the measure. Publish module 26 populates database schema 36 with the multidimensional data. When publishing a particular value for a measure, publish module 26 determines the data type and stores the value in the appropriate column of database schema 36.

Model generator 32 automatically generates base reporting model 40 based on database schema 36. Model generator 32 may further allow user 12A to modify base reporting model 38 to produce user reporting model 38. User reporting model 38 may, for example, define additional calculations or format attributes for use by reporting tool 34 when generating reports 17 to present the published multidimensional data. Model generator 32 may maintain activity log 22 to record the modifications to base model 40 in order to subsequently regenerate user reporting model 38.

Figure 4:
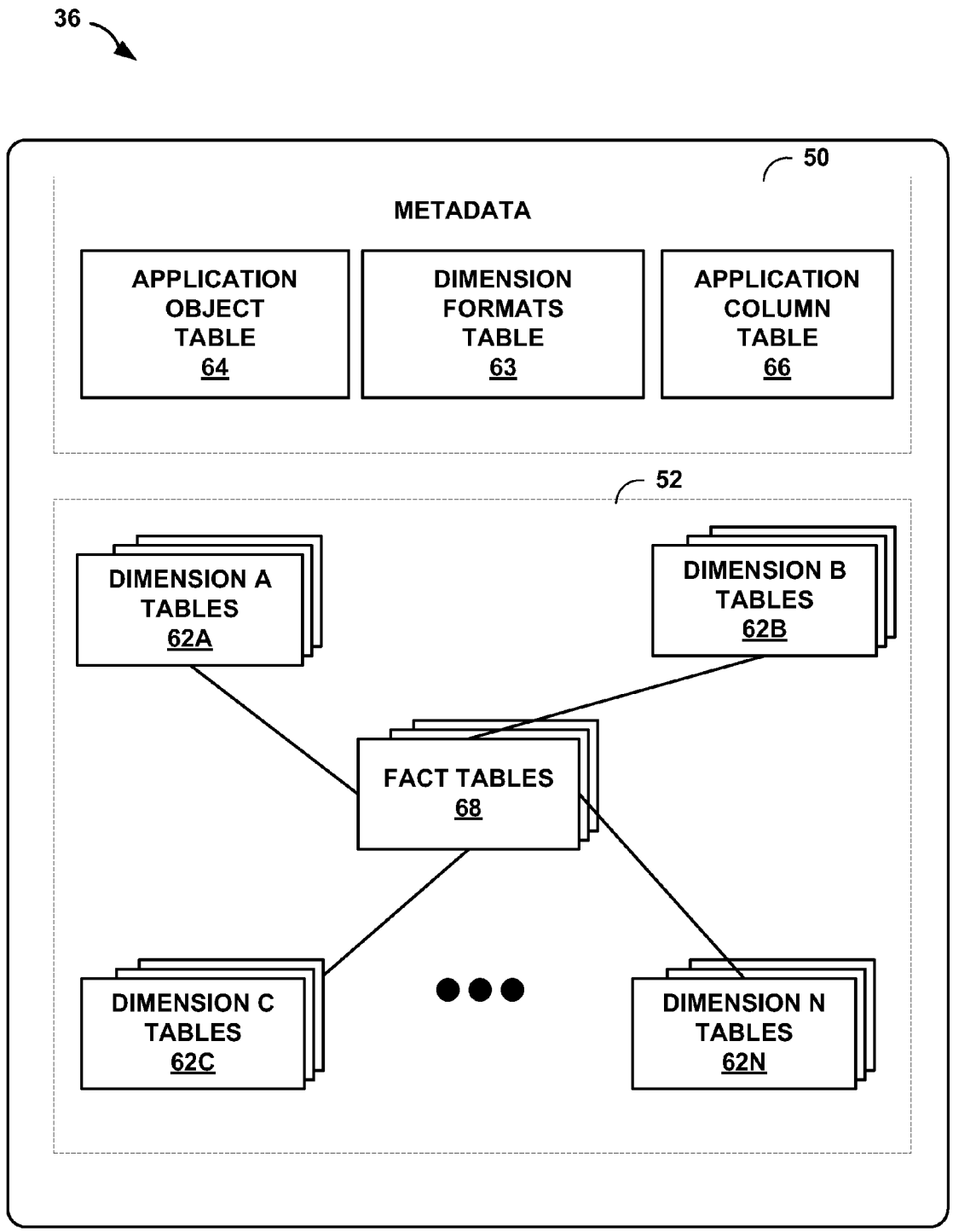
FIG. 4 is a diagram illustrating one embodiment of the relational schema, including a relational star schema for storing metadata pertaining to the data cubes and metadata tables pertaining to the produced schema.

FIG. 4 is a diagram illustrating one embodiment of database schema 36. In the illustrated embodiment, database schema 36 includes a metadata region 50 for storing metadata and a data region 52 for storing the published multidimensional data.

In the example of FIG. 4, schema generator 30 automatically organizes data region 52 in the form of a relational star schema for each data publication. Data region 52 is referred to as a "star schema" because the entity-relationship diagram of this schema resembles a star, as illustrated in FIG. 4, with "points" of the star radiating from a central table. In particular, the center of the star consists of a large fact table 68, and the points of the star are dimension tables 62A-62N ("dimension tables 62").

For each publication of multidimensional data from data cubes 24, database schema 36 updates metadata region 50 and generates a new star schema. Consequently, each publication is characterized by a star schema having a very large fact tables 68 that contain the primary information, (i.e. data cube keys and measures), and a number of smaller dimension tables 62. Dimension tables 62 may be viewed as lookup tables, each of which contains information about the dimension members for a particular data cube in the fact table. As one example, dimension A may represent geographical sales regions, dimension B may represent products, dimension C may represent time, and dimension D may represent versions.

In general, metadata region 50 stores metadata pertaining to published data cubes 24. In particular, the metadata defines the data types and formats for measures within any of data cubes 24 that have been published. Metadata region 50 also stores metadata that describes database schema 36 itself. This metadata may allow for enhanced interpretation of database schema 36 by a developer or an automated tool. As one example, reporting tool 34 and model generator 32 may utilize the metadata describing database schema 36 for enhanced interpretation and reporting of the published multidimensional data.

In this example, metadata region 50 includes an application object table 64, an application column table 66 and a dimension formats table 63. Application object table 64 contains metadata that describes the different dimension tables 62 and fact tables 68 automatically created by schema generator 30 to publish the selected multidimensional data. In particular, each row of application object table 64 contains metadata for a different multidimensional object that was published and, more specifically, the dimension tables 62 that store the multidimensional object. Table 1 lists exemplary columns for one embodiment of application object table 64.

TABLE 1

| Column | Description |
| --- | --- |
| objectname | Contains the name of the table used to store the model objects, such as cubes and dimensions. |
| displayname | Contains the display name, as seen by users 12 in the enterprise application, of the model objects, such as a cubes and dimensions. |
| objectid | Contains a global unique identifier (GUID) of the model object. |
| objecttypeid | Contains an object type identifier that identifies which type of table this row describes. |
| datastoretypeid | Contains a data store object type identifier that identifies what type of database object this row describes for example, a database TABLE or a database VIEW. |
| objectversion | Specifies a version of the enterprise software from which the object was created. |
| lastsaved | Contains the timestamp of when the object was last published. This column is optional. |
| libraryid | Contains an identifier for the enterprise software library from which this object was created. This column is optional. |

Application column table 66 contains metadata that describes the individual columns of the different dimension tables 62 and fact tables 68. Specifically, each row of application column table 66 describes a respective column of dimension tables 62 or fact tables 68. As a result, application column table 66 will contain multiple rows for each row in application object table 62. Table 2 lists exemplary columns for one embodiment of application column table 66.

TABLE 2

| Column | Description |
| --- | --- |
| objectname | Contains the name of the model object's table. The objectnames are the same names found in the objectname column of the applicationobject table. |
| columnname | Contains the name of the column contained in the table used to publish an object. |
| displayname | Contains a display name, as seen by users in the enterprise application, to associate with the column contained in the table used to publish planning objects. This is essentially a readable name for the column instead of the name used in a database system that may have limitations for certain characters. |
| columnid | This is a GUID associated with the column contained in the table used to publish a planning object |
| objecttypeid | Contains the objecttype id of the table containing this column. |
| columntypeid | Contains an independent data type identifier for this column. This identifier can be, for example, TEXT_VALUE or FLOAT_VALUE. |
| columnorder | Contains the order of this column in the table used to publish a planning object. This is used for ordering the display of columns. |
| logicaldatatype | Contains an RDBMS independent type identifier for this column. |

Dimension formats table 63 contains metadata that describes the data type and formatting information of measure columns of the different fact tables 68. Specifically, each row of dimension formats table 63 describes the data type of the measure column and the attributes of its format such as the scale of a numeric value. Table 3 lists exemplary columns for one embodiment of dimension formats table 63.

TABLE 3

| | |
| --- | --- |
| dimensionguid | The GUID of the dimension which contains the formatted column. |
| itemid | The GUID of the column which has a data type and format. |
| formattype | The data type of the column. For example, numeric, data or percentage. |
| negativesignsymbol | The symbol to use to represent negative values |
| noofdecimalplaces | The number of decimal places (or precision) to display. |
| scalingfactor | The scaling factor of a numeric value. |
| zerovaluechars | The characters to use to represent values which are equal to 0. |

Figure 5:
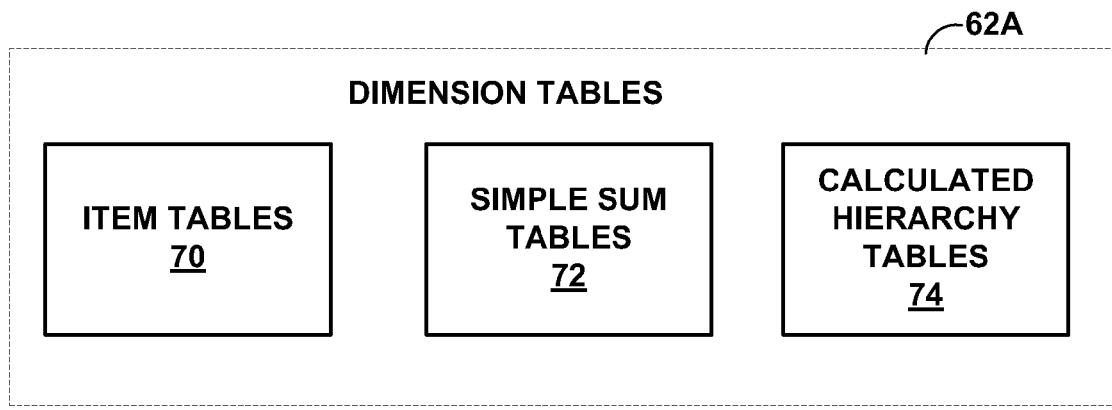
FIG. 5 is a diagram illustrating one embodiment of the dimension tables of the relational star schema.

FIG. 5 illustrates an example organization of database schema 36 for a single dimension, e.g., dimension 62A in this example. When forming database schema 36, schema generator 30 examines the dimensions that compose the cubes and exports the dimension information in three forms.

First, schema generator 30 creates item tables 70 that list of all the members of all the dimensions being published. In particular, item tables 70 provide a flat list of the dimensions with no hierarchy information. In one embodiment, each row of item tables 70 is capable of storing a member name, a caption, a global unique identifier (guid), an integer identifier and a display order within the dimension. Item tables 70 may be used to generate reports 17 for displaying all of the data in the cube without needing to recreate any calculations with the report. In other words, all the members of the dimension from leaf members to root members are present within item tables 70.

Next, schema generator 30 generates simple sum tables 72. Simple sum tables 72 contain dimension information in hierarchical form. In particular, simple sum tables 72 provide a dimension hierarchy that is guaranteed to aggregate to the correct totals represented within the data cube. In other words, reporting tool 34 may apply summation operations of the lower levels of the hierarchy when generating reports 17 and the same totals will be realized as the totals within the data cube. Consequently, reporting tool 34 may utilize simple sum tables 72 to recreate certain calculations within the data cube. This allows reports 17 to manipulate the sums and perform further analysis on the published data. In order for schema generator 30 to produce simple sum tables 72 in a manner that is guaranteed to provide correct totals, the schema generator may remove some members of the dimension as described herein with respect to FIGS. 7A-10B.

Finally, schema generator 30 generates calculated hierarchy tables 74 that contain complete dimension information in hierarchical form. In other words, the calculated hierarchy is represented to give as much information as possible. However, the dimension hierarchy is not guaranteed to be aggregatable. In particular, calculations within reports 17 may not necessary provide the same totals since reporting tool 34 likely has a more limited calculation engine than enterprise planning system 14.

Figure 6:
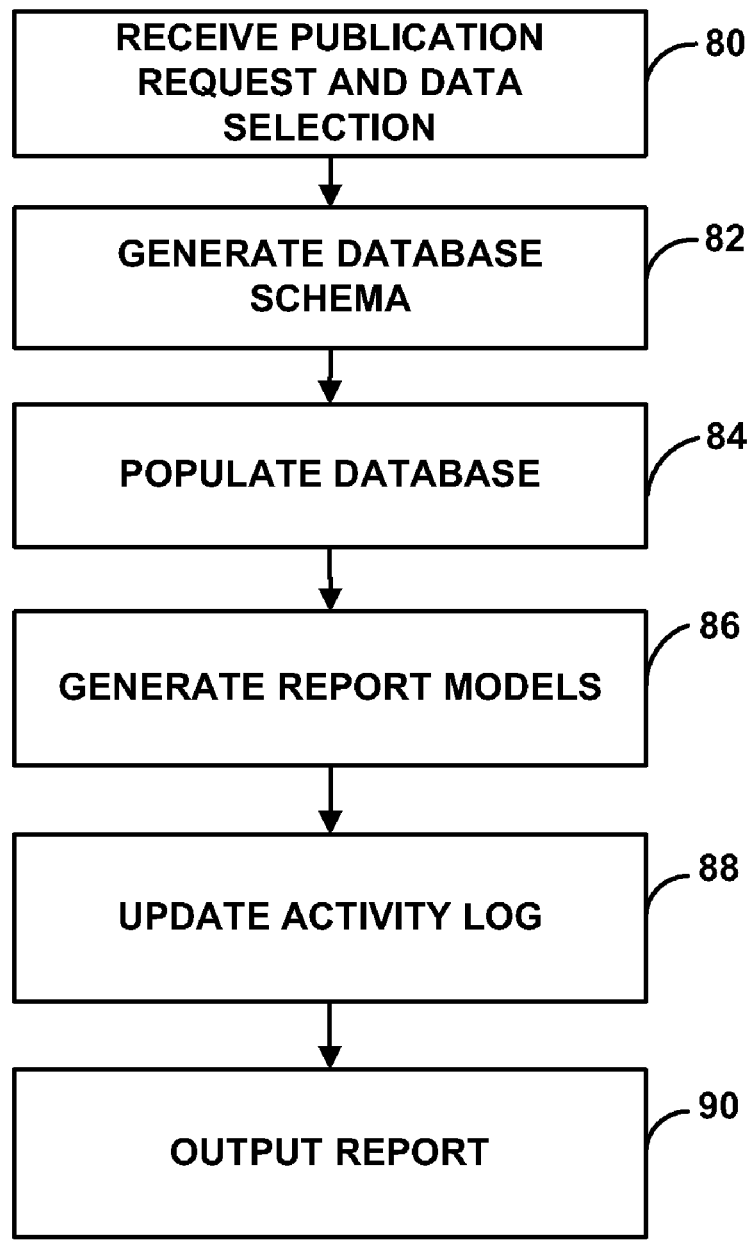
FIG. 6 is an overview of an example process for producing and populating a database schema, and for publishing reports from the database schema.

FIG. 6 is a flowchart that illustrates exemplary operation of the software components illustrated in FIG. 3. Initially, a user, such as user 12A, interacts with publish module 26 to initiate a publication process. In particular, publish module 26 provides a user interface by which user 12A identifies one of data cubes 24 and selects one or more of the dimensions of the identified data cube for publication (80). As described in further detail below, publish module 26 may analyze the selected data cubes and automatically provide user 12A with a default dimension for publish per data cube. During this process publish module 26 may automatically remove dimensions which are not good candidates for publication. The publish process determines this "best" dimension for publication as follows. First, publish module 26 identifies all of the dimensions in the selected cubes for which the modeler sets formatting information for the data. If only one dimension in a give cube has formats, publish module 26 select that dimension as the default dimension for publication for the respective data cube. If two or more dimensions in any given cube have formats, publish module 26 selects the dimension having the lowest assigned priority of calculation, where the calculations with the lowest priority are executed first. If the dimensions of the data cube have equal calculation priority, publish module 26 selects the first dimension as the default dimension for publication for the data cube.

Next, publish module 26 invokes schema generator 30 which automatically produces database schema 36 to store the multidimensional data in relational database form (82). During this process, schema generator 30 creates a central fact table 68 for database schema 36 and one or more dimension tables 62 for each dimension being published. For each dimension, schema generator 30 creates one or more of an item table 70, a simple sum table 72 or a calculated hierarchy table 74 depending upon the desires of user 12A.

Further, schema generator 30 stores metadata in data cube metadata table 64 that describes the selected data cube and constituent dimensions being published. Schema generator also stores metadata in schema metadata table 66 that describes database schema 36. Schema generator 30 may be a separate software application from publish module 26 or may be one or more software routines (e.g., dynamic link libraries) callable by publish module 26.

After creation of database schema 36, publish module 26 accesses the selected data cube 24 and retrieves multidimensional data to populate the database schema (84). As described above, publish module 26 populates the corresponding fact table 68 of the newly created database schema 36 with keys and measures of the data cube being published. Publish module 26 then populates the dimension tables 62 for each dimension being published. For each dimension, publish module 26 populates one or more of an item table 70, a simple sum table 72 or a calculated hierarchy table 74 depending upon the desires of user 12A.

Next, model generator 32 automatically generates base reporting model 40 based on the newly created database schema 36 (86) and creates user reporting model 38 by importing the definitions contained in the base reporting model. Model generator 32 allows user 12A to enhance user reporting model 38 (e.g., by defining layout and formatting attributes). Model generator 32 maintains activity log 22 to record the modifications to user reporting model 38 (88). In this manner, model generator 32 may reapply the changes to regenerate user reporting model 38 in the event database schema 36 and base reporting model 32 are subsequently changed.

In response to input from user 12A, reporting tool 34 outputs reports 17 to present the published multidimensional data in accordance with the enhanced user reporting model 38 (90).

FIGS. 7A-10B graphically illustrates an example process by which schema generator 30 generates simple sum tables 72 of dimension tables 62. The simple sum tables 72 contain dimension members in a hierarchical form. With respect to simple sum tables 72, schema generator 30 generates simple hierarchies used to describe simple parent-child relationships between nodes. Each row of a simple sum table 72 represents a leaf member and, more specifically, each row represents a complete path from a root of the dimension hierarchy to a leaf member.

As discussed briefly above, in order for schema generator 30 to produce simple sum tables 72 in a manner that is guaranteed to provide correct totals, schema generator 30 may reorganize the nodes in the hierarchy to ensure that they are aggregatable. By guaranteeing that the information is aggregatable, report tool 34 may apply summation operations of the lower levels of the hierarchy and the same totals will be realized as the totals within the data cube. Consequently, report tool 34 may utilize simple sum tables 72 to recreate certain calculations within the data cube. This allows reports 17 to manipulate the sums and perform further analysis on the published data.

In general, schema generator 30 generates a simple sum hierarchy from a dimension based on a set of rules. First, schema generator 30 scans each dimension item and uses the item's associated mathematical expression to identify the item's parent. The parent of an item is the first simple sum that references the item. In the case where there are multiple candidates for the parent of a node, the node is assigned to the first parent in model order and the other candidate parents are considered to be leaf nodes in the hierarchy. The model order refers to the order in which items have been added to the model. In the case where a parent cannot be identified using the two previous rules and the node is not a simple sum, the item is considered to be a root node (referred to as orphan node in the rest of the text). Leaf nodes are simply the end nodes as defined by this algorithm and may be associated with complex calculations. Finally, all parents and ancestors of the simple sum nodes are included in the final dimension hierarchy that is published.

Simple sum nodes are those nodes whose associated calculation is a simple sum operating on nodes that are entirely independent of any other nodes in the hierarchy. Non-simple sums may include, for example, those nodes whose associated calculation is anything other than a simple sum, such as a multiplication. Examples of such non-simple sums are illustrated with respect to FIGS. 9A-9B and 10A-10B. Another example of a non-simple sum may include those nodes whose associated calculation operates on a node that is not entirely independent of another node in the hierarchy. One example of such a non-simple sum is illustrated with respect to FIGS. 8A-8B.

In one embodiment, to discard the non-simple sum nodes, the following rules may be applied. First, if a node has more than one parent, assign parentage to the first parent in the model order, and move sub-hierarchies of the second parent in the hierarchy order to the root. This will result in the second parent in the hierarchy order becoming a leaf node. Second, if a node has an associated calculation that is a not simple summary, move all sub-hierarchies of that node to the root. This will result in the non-simple sum node becoming a leaf.

In the examples shown in FIGS. 7A-10B, nodes on an enterprise planning model are illustrated. The nodes are represented by letter/number combinations and the relationships between items are drawn as lines. Parent nodes represent items that are calculated from other nodes. Parent nodes have their example values shown in parentheses, such as "(3)" for node [B1] in FIG. 7A. Leaf nodes have 2 values displayed, such as "(5,0)" for node [D1] in FIG. 7A. The first item in parentheses is the node value, and the second item is a "leaf code." Schema generator 30 utilizes the leaf codes to describe information that was lost when the dimension hierarchy was reorganized in order to guarantee that the hierarchy will aggregate the correct totals represented within the data cube.

In the example embodiments shown in FIGS. 7A-10B, leaf codes are as follows:
  0=Direct child of a simple sum node,
  1=The leaf has multiple parents,
  2=The leaf item is part of a sub-hierarchy which has been moved to the root, and
  3=The leaf item is an orphan or had no parent.

Figure 7A:
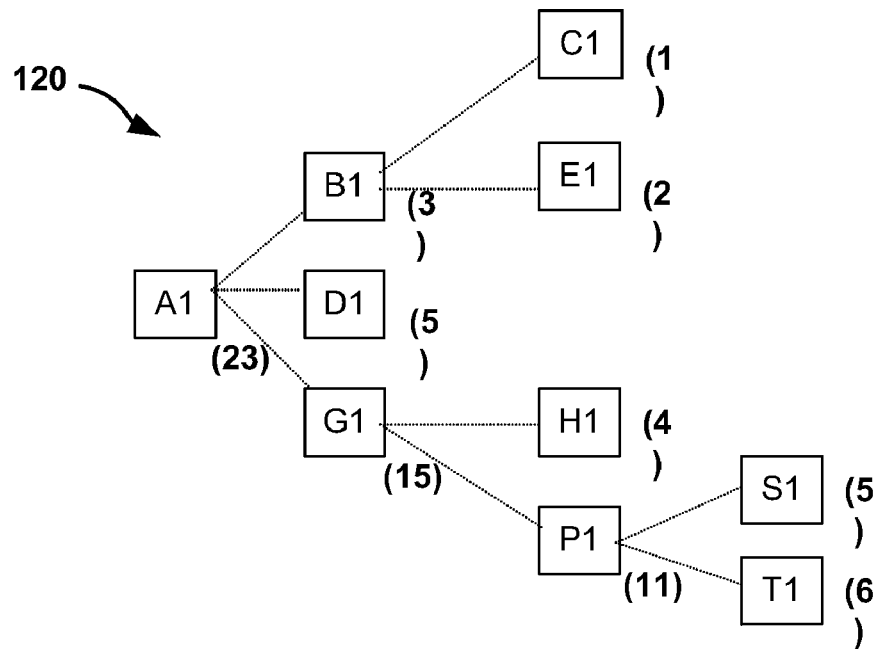
FIG. 7A show an example of a simple summary dimension hierarchy.

FIG. 7A represent an example dimension hierarchy defined within a data cube prior to publication. In this example, all of the nodes of the dimension hierarchy are defined by simple summaries. Specifically, the relationships between the nodes in FIG. 7A are described within the data cube by the following equations.

$$A1=B1+D1+G1,$$

$$B1=C1+E1,$$

$$G1=H1+P1, \text{ and}$$

$$P1=S1+T1.$$

Figure 7B:
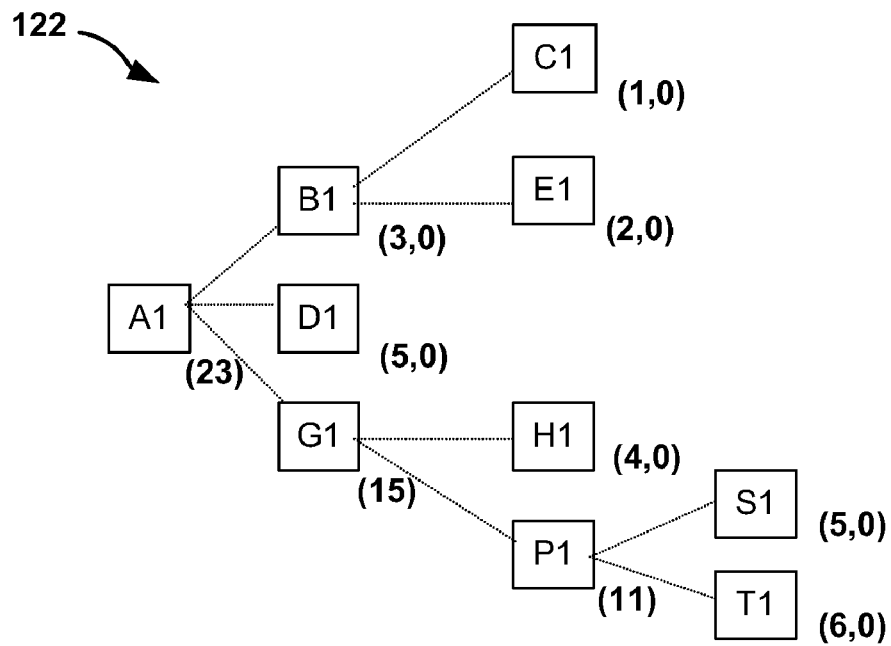
FIG. 7B depicts a corresponding simple summary hierarchy produced by a schema generator during publication for storage within a simple sums table.

FIG. 7B depicts the simple summary hierarchy 122 produced by schema generator during publication for storage within simple sums table 72. The leaf node values and leaf codes of simple sum hierarchy 122 are shown in parenthesis. Note that because every node in hierarchy 120 is already described by a simple summary, each leaf node [C1], [E1], [D1], [H1], [S1], and [T1] has a leaf code equal to 0. No reorganization of hierarchy 120 was required in this case because each node is defined as a simple summary.

Figure 8A:
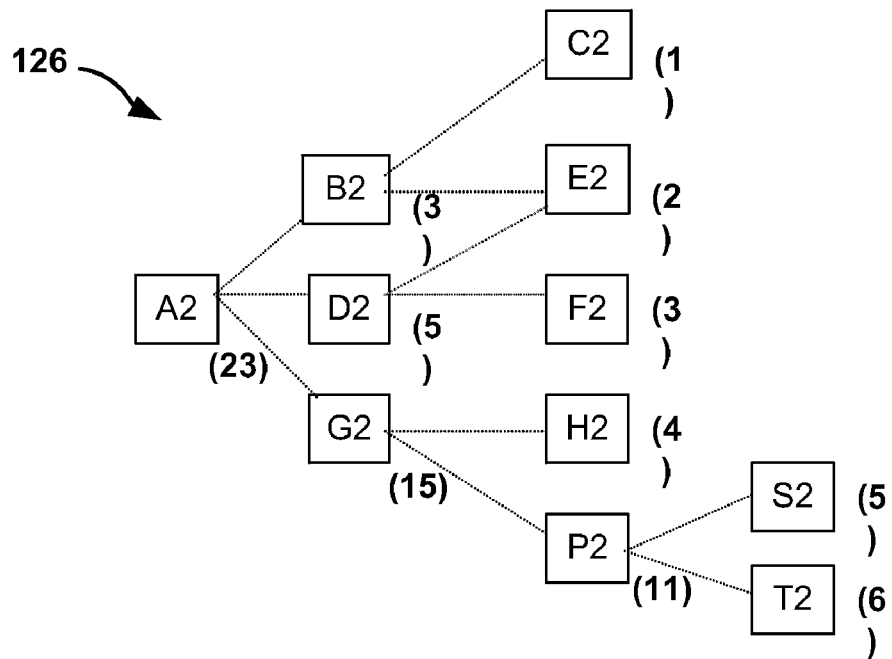
FIG. 8A shows an example of a non-simple summary dimension hierarchy including a leaf node with multiple parents.

FIG. 8A shows an example of a dimension hierarchy 126 including a leaf node with multiple parents prior to publication. In this example, the relationships between the nodes in FIG. 8A are described by the following equations.

$$A2=B2+D2+G2,$$

$$B2=C2+E2,$$

$D2=E2+F2,$ $G2=H2+P2,$ and $P2=S2+T2.$

Figure 8B:
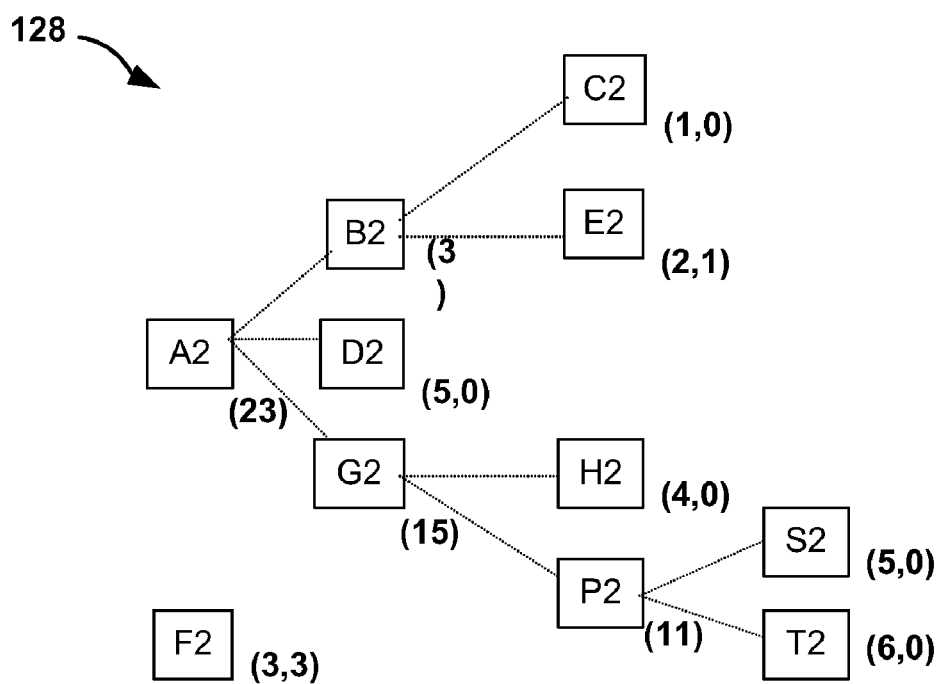
FIG. 8B depicts the resulting simple summary hierarchy produced by schema generator during publication for storage within the simple sums table.

In this example, leaf node [E2] has more than one parent. In that case, schema generator 30 assigns parentage to the first parent in model order. In one embodiment, schema generator 30 reorganizes hierarchy 126 such that parent node [D2] becomes a leaf node and node [F2] becomes orphaned and is moved to the root. FIG. 8B depicts the resulting simple summary hierarchy 128 produced by schema generator during publication for storage within simple sums table 72.

Figure 9A:
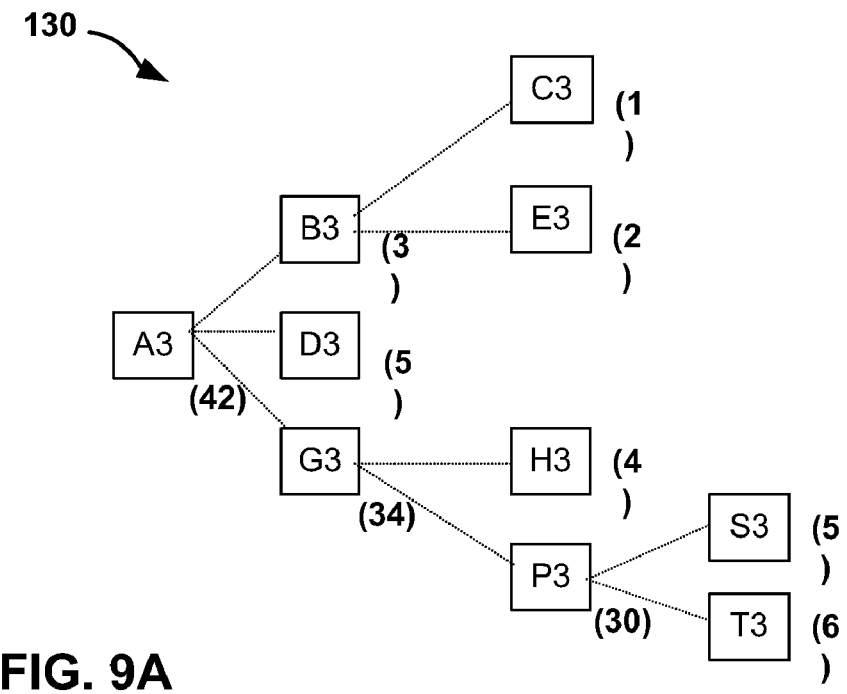
FIG. 9A shows an example of a non-simple summary dimension hierarchy.

FIG. 9A shows an example of a dimension hierarchy 130 including a non-simple summary. The relationships between the nodes in FIG. 9A are described by the following equations.

$A3=B3+D3+G3,$ $B3=C3+E3,$ $G3=H3+P3,$ and $P3=S3*T3.$

Figure 9B:
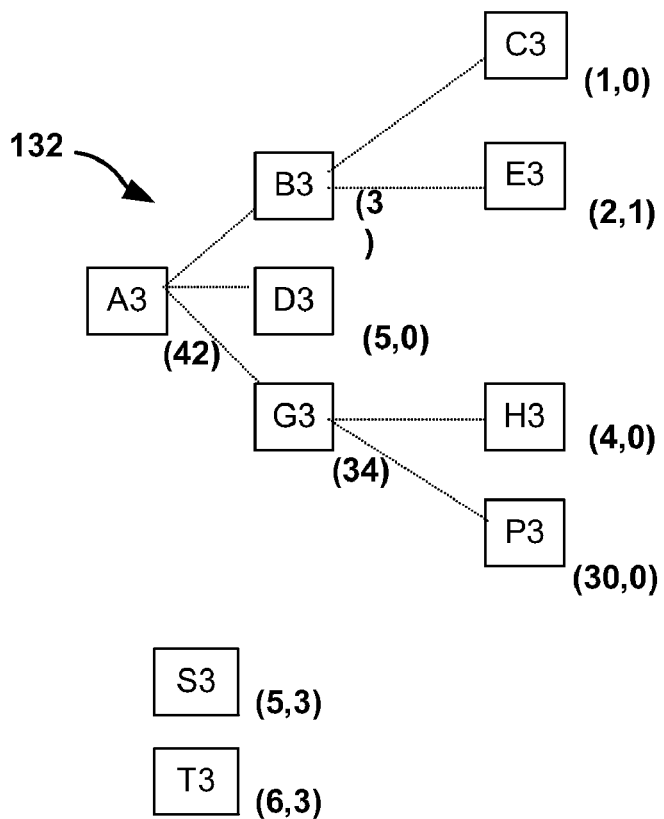
FIG. 9B depicts the resulting simple summary hierarchy produced by schema generator during publication for storage within the simple sums table.

In the example shown in FIG. 9A, parent node [P3] is the product of leaf nodes [S3] and [T3]. In one embodiment, schema generator 30 moves leaf nodes of non-simple summaries to the root. Since node [P3] became a leaf node, node [S3] and [T3] were orphaned and moved to the root. FIG. 9B depicts the resulting simple summary hierarchy 132 produced by schema generator during publication for storage within simple sums table 72.

FIG. 10A shows an example of a dimension hierarchy 134 including a sub-hierarchy 133 of a non-simple summary. The relationships between the nodes in FIG. 10A are described by the following equations.

$A4=B4+D4+G4,$ $B4=C4*E4,$ and $C4=S4+T4.$

In this example, node [B4] is the product of node [C4] and [E4]. Node [C4] has its own simple summary hierarchy. FIG. 10B depicts the resulting simple summary hierarchy 136 produced by schema generator during publication for storage within simple sums table 72. Since non simple sum nodes cannot be parents, schema generator 30 reorganizes the hierarchy such that node [B4] becomes a leaf, node [E4] and [C4] become orphaned and moved to the root. Node [C4] keeps its sub-hierarchy.

FIG. 11 shows a portion of an example fact table 68 created for a published data cube. In the example of FIG. 11, fact table 68 contains an identifier column 140A-140C for each dimension other than the dimension selected for publication with this data cube. Thus, in the example of FIG. 11, fact table 68 includes identifiers columns 140A-140C for an "employee" dimension, an "elist" dimension, and a "versions" dimension.

Fact table 68 also contains one or more columns for each measure of the cube, depending on which columns are selected by user 12A. In particular, fact table 68 contains columns to support the data types requested by user 12A. In this example, three columns are used for each measure. Consequently, schema generator 30 generates fact table 68 to include column 142A-142C to store data for the "grade" measure in text, float, and date format, respectively. Similarly, multiple columns are used to store data for a "base salary" measure and other measures, although FIG. 11 depicts only a portion of fact table 68 for ease of illustration.

Figure 12:
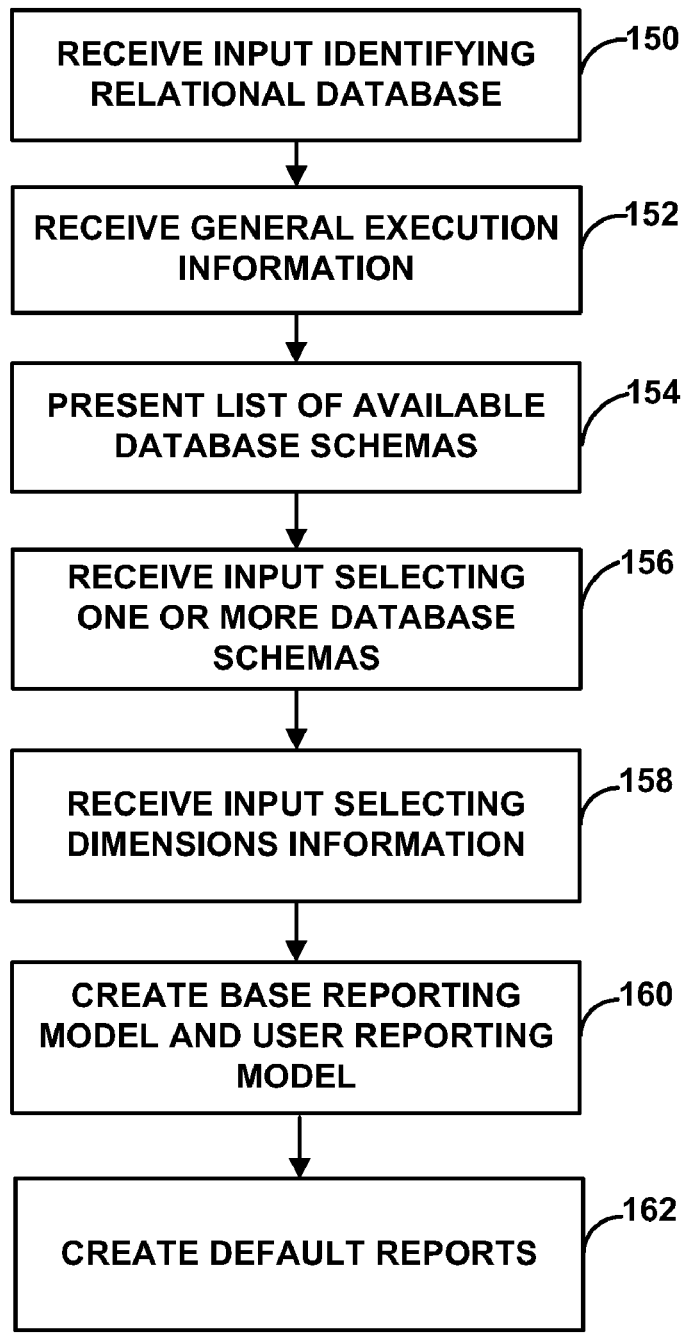
FIG. 12 is a flowchart illustrating an example process for generating a reporting model.

FIG. 12 is a flowchart illustrating in further detail an exemplary process of generating base reporting model 40 and user reporting model 38. Initially, a user, such as user 12A, interacts with model generator 32 to identify a relational database storing one or more publication schemas, such as database schema 36 (150).

Next, user 12A provides general information required to execute the model creation process, such as connection details for connecting with reporting tool 34 and a location to store base reporting model 40 and user reporting model 38 once created (152).

Model generator 32 then presents user 12A with a list of database schemas (e.g., star schemas) that were previously published as described above in the selected relational database (154). Model generator 32 receives input from user 12A selecting one or more of the database schemas for inclusion in generating the reporting models, i.e., base reporting model 40 and user reporting model 38 (156).

Next, user 12A selects particular dimension information for use in the reporting models (158). In particular, if the multidimensional data stored in the selected database schemas can be recreated using different views of the dimension, model generator 32 allows user 12 to select one or more of the views for each data cube for use in reporting models.

Model generator 32 automatically interprets the metadata stored within the selected database schemas and outputs a base reporting model 40 based on the selected dimensional information (160) and a user reporting model 38 by importing the definitions in the base reporting model 40. Finally, model generator 32 may invoke reporting tool 32 to create one or more default reports for each database schema selected by the user when generating the reporting models (162). These reports can serve as the basis for authoring more advanced reports.

Figure 13:
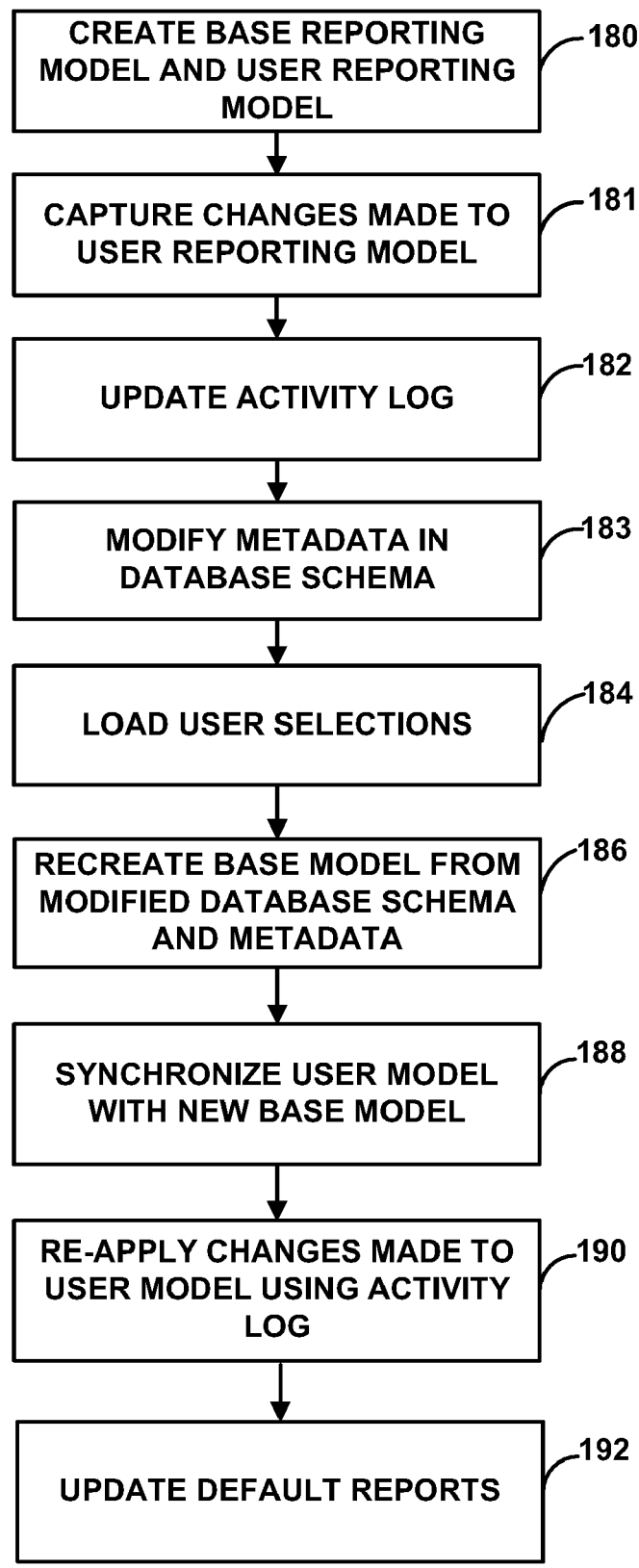
FIG. 13 is a flowchart illustrating an example process for updating a reporting model.

FIG. 13 is a flowchart illustrating in further detail an exemplary process of updating user reporting model 38. Initially, model generator 32 imports the definitions from base reporting model 40 into user reporting model 38 (180), and allows a user, such as user 12A, to modify the user reporting model 38 (181). For example, user 12A may rename elements of the model, remove elements or move elements within the user reporting model 38. Model generator 32 captures the changes made to user reporting model 38 and maintains them in activity log 22. Moreover, model generator 32 maintains activity log 22 to record the particular changes and the order in which the changes were applied (182).

In addition, model generator 32 allows user 12A to modify the metadata contained in the underling database schema 36 used in generating the reporting model (183). For example, user 12A may select additional data cubes, may add members or levels to dimensions or may change the security settings applied to the published multidimensional data.

Once the changes have been made, model generator 32 loads the initial selections made by the user as described in reference to FIG. 12 (184). In particular, model generator 32 loads the dimension selections originally used to generate the reporting models.

Next, model generator 32 deletes the old base reporting model 40 and regenerates the base reporting model based on the modified metadata within database schema 36 (186). Model generator 32 then synchronizes user reporting model 38 (188). In particular, model generator 32 deletes the user reporting model and recreates the user reporting model from the newly generated base reporting model 40. Model generator 32 then re-applies the changes recorded in activity log 22

(190) to restore the previous enhancements made to user reporting model 38 by user 12A. Model generator 32 then updates default reports based on the updated user reporting model (192).

In this manner, model generator 32 preserves enhancements to a user reporting model 38 while allowing the user to modify the underlying database schema 36 containing published multidimensional data. Reporting tool 34 utilizes user reporting model 38 to generate reports 17.

In one embodiment, model generator 32 creates base reporting model 40 as a plurality of extensible markup language (XML) files. Model generator 32 generates a set of folders in the reporting model to store definitions that describe a "physical view" of database schema 36. In particular, the first set of folders contains information describing each relational table of database schema 36, including fact tables 68 and dimension tables 62. The second set of folders contains definitions that describe a "business view" and contains information describing the relationship between the tables. In particular, the second set of folders contains definitions for each star schema associated with each fact table within the database schemas selected for the report model. When generating base reporting model 40 model generator 32 includes definitions that specify the relationship between the fact tables and the dimension tables and, in particular, the primary and foreign keys and the cardinality of the relationships.

Further, when creating base reporting model 40, model generator 32 generates the definitions to define objects for the relational tables and columns of database schema 36. Model generator 32 utilizes the stored metadata to ensure that the names assigned to the tables and columns in the reporting model are the same as in the model stored in the enterprise planning system. Model generator 32 generates definitions for columns which specify the usage (e.g., data types, attributes, identifiers) for each column within database schema.

Model generator 32 also includes definitions within the reporting model that allows reporting tool 34 to understand the hierarchical structure of the dimensions described by the various dimension tables 62 (e.g., item tables 70, simple sum tables 72 and calculated hierarchy tables 74). As described above, this may be used by reporting tool 34 when user 12A wants to aggregate and summarize values in one or more of reports 17. These definitions are used by the reporting tool to make aggregations at the correct level when shared dimensions are used.

Figure 14:
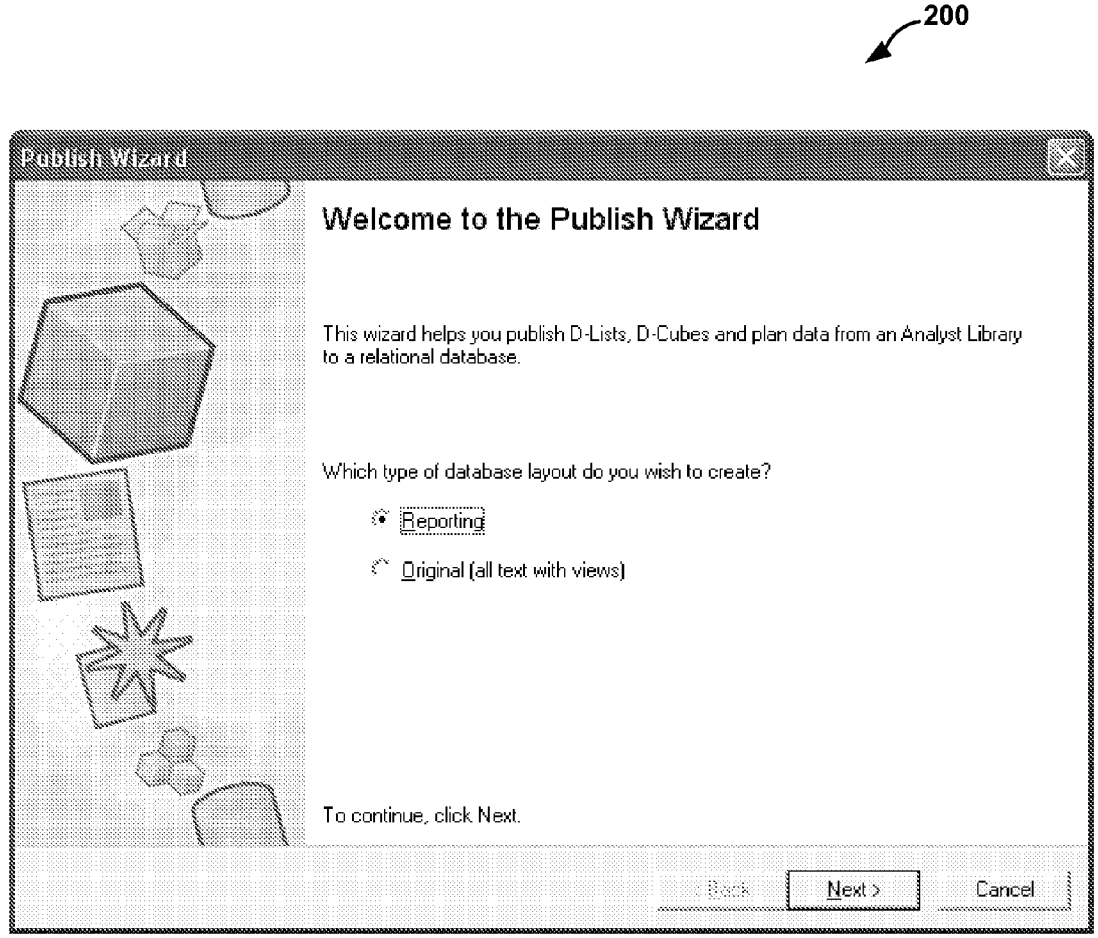
FIG. 14 is a screen illustration of an example user interface with which a user interacts to initiate publication of multidimensional data.
Figure 15:
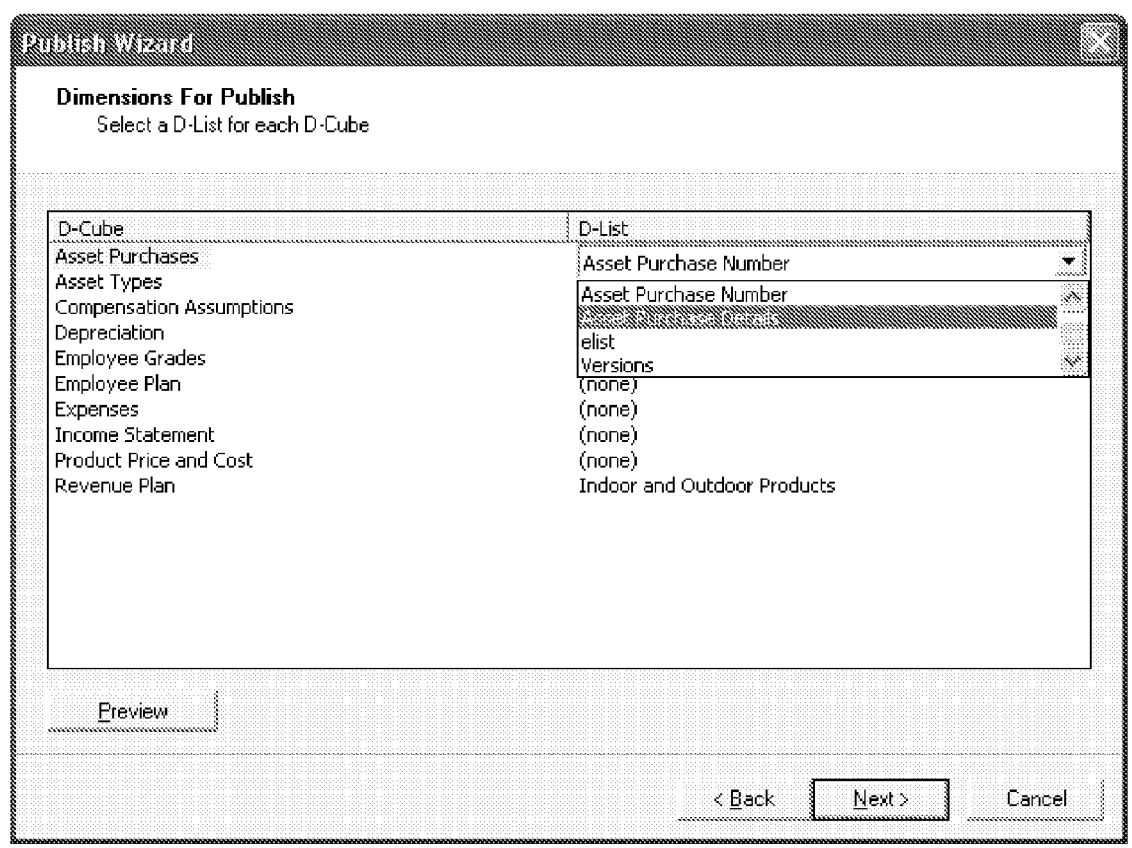
FIG. 15 is a screen illustration of an example user interface with which a user selects one or more dimensions for any of the available data cubes.

FIG. 14 is a screen illustration of an example user interface 200 with which a user, such as user 12A, interacts to initiate publication of multidimensional data. FIG. 15 is a screen illustration of an example user interface 202 with which user 12A selects one or more dimensions ("D-List") for any of the available data cubes ("D-Cubes").

Figure 16:
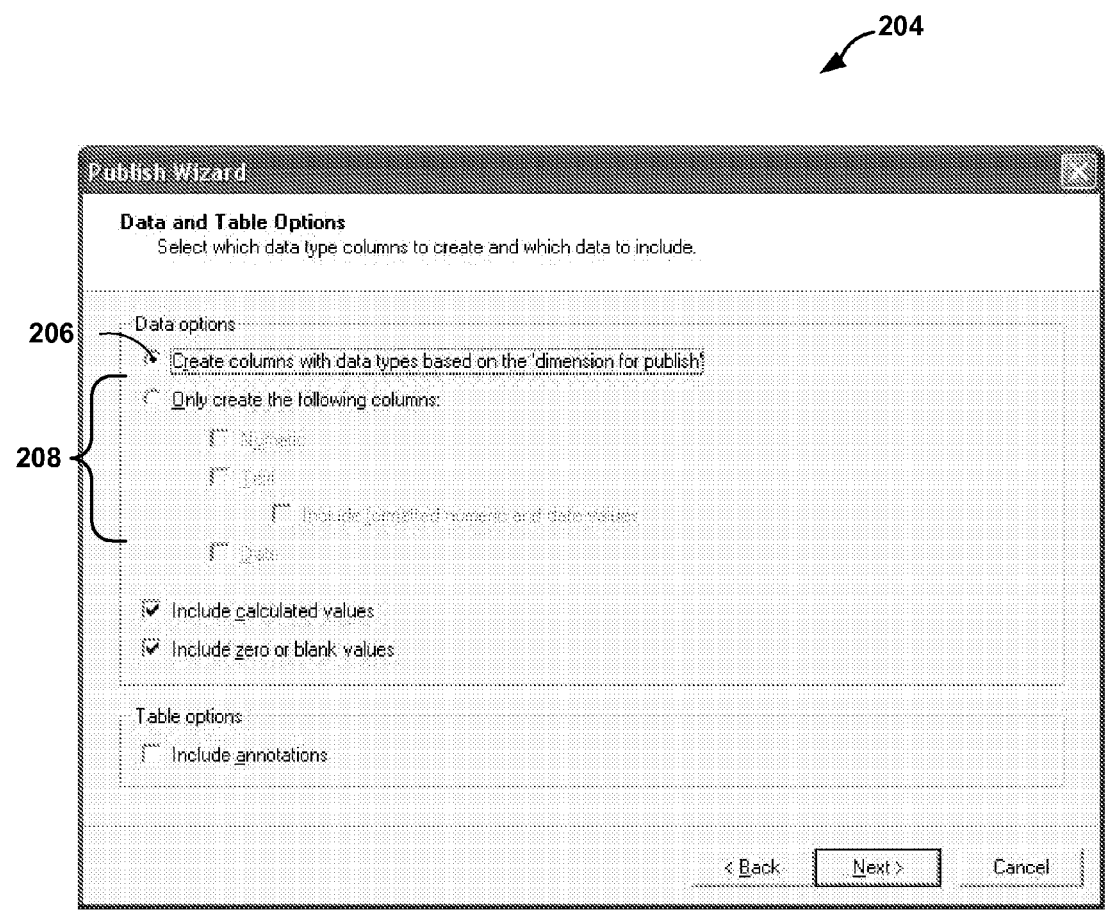
FIG. 16 is a screen illustration of an example user interface with which a user may select different options to create columns.

FIG. 16 is a screen illustration of an example user interface 204 with which user 12A may select option 206 to direct schema generator 30 to create all columns necessary to support the data types for the dimension being published. Alternatively, user 12A may select one or more of data types 208 to direct schema generator 30 to only create columns for the specified data types.

FIG. 17 is a screen illustration of an example user interface 210 produced by schema generator 30 to display the columns and their corresponding column name and column data types which will be created when the database schema 36 is created.

Figure 18:
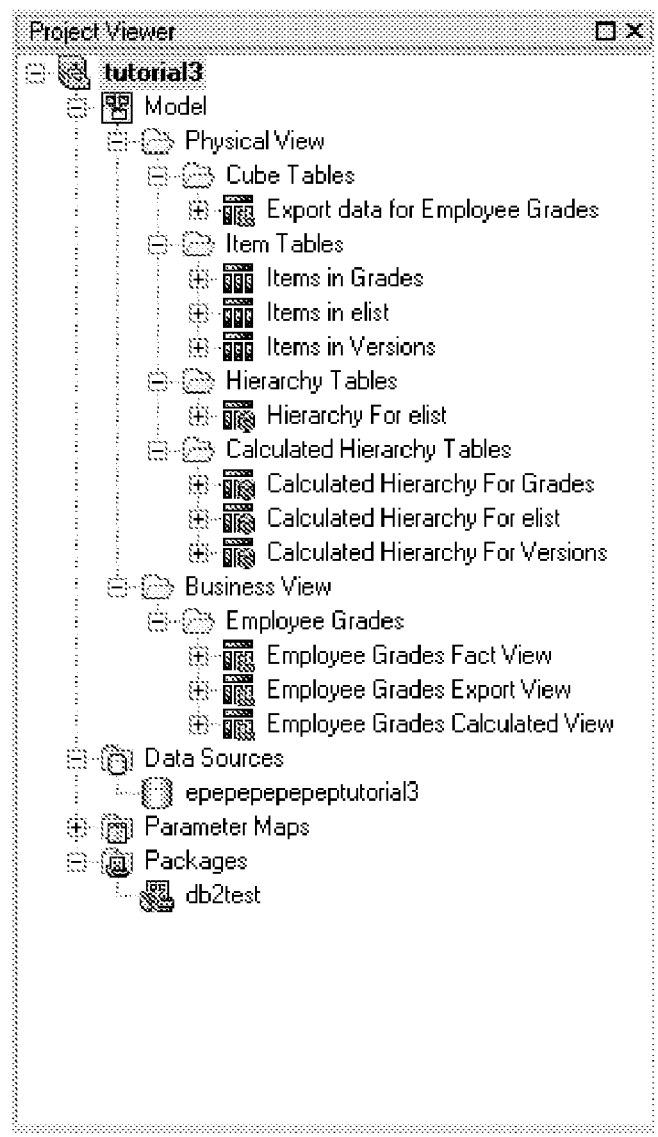
FIG. 18 is a screen illustration of an example user interface of the model generator.

FIG. 18 is a screen illustration of an example user interface 214 of model generator 32. As illustrated, user interface 212 provides a list of models. For each model, user interface 214 displays the corresponding folders (e.g., physical view folder, business view folder and all sub-folders) as well as the contained object definitions such as table definitions.

Figure 19:
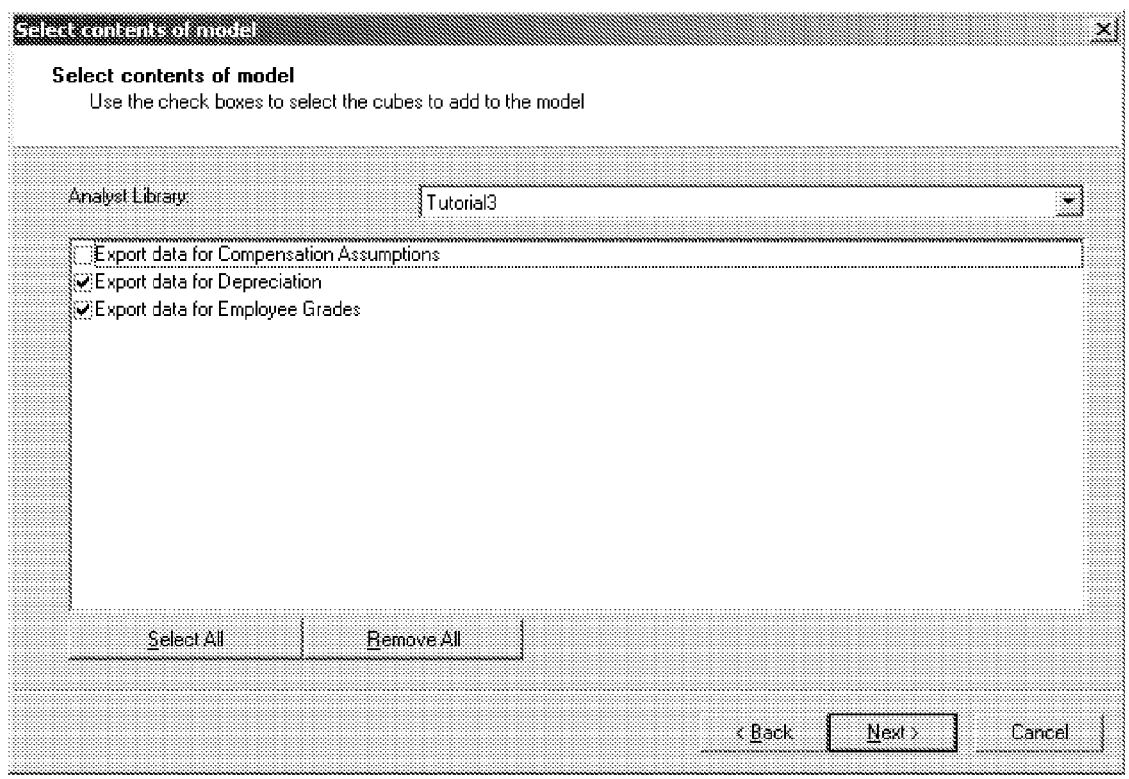
FIG. 19 is a screen illustration of another example user interface of the model generator.

FIG. 19 is a screen illustration of an example user interface 216 of model generator 32 by which user 12A selects data cubes from database scheme 36 to utilize when generating base reporting model 40 and user reporting model 38.

Figure 20:
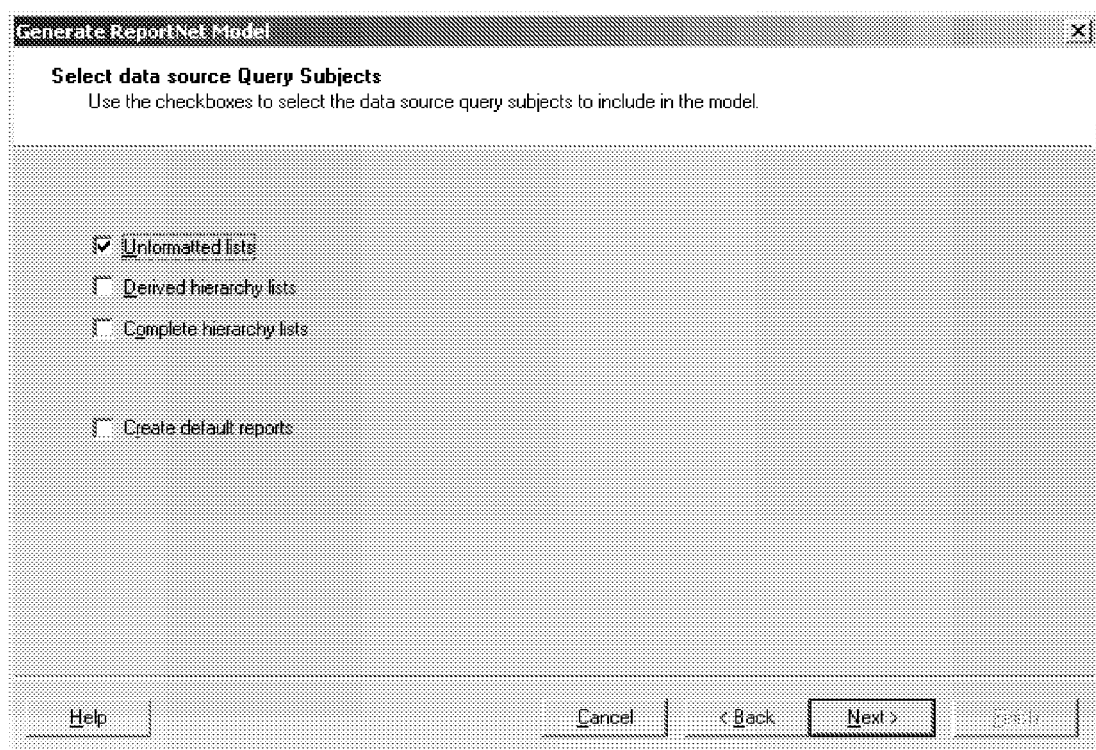
FIG. 20 is a screen illustration of another example user interface of the model generator.

FIG. 20 is a screen illustration of an example user interface 218 of model generator 32 by which user 12A selects the type of dimension hierarchy information to include in base reporting model 40 and user reporting model 38. In particular, user interface 218 allows user 12A to select one or more: (1) unformatted lists form items tables 70, (2) derived hierarchy lists from simple sum tables 72, or (3) calculated hierarchy lists from calculated hierarchy tables 74.

Figure 21:
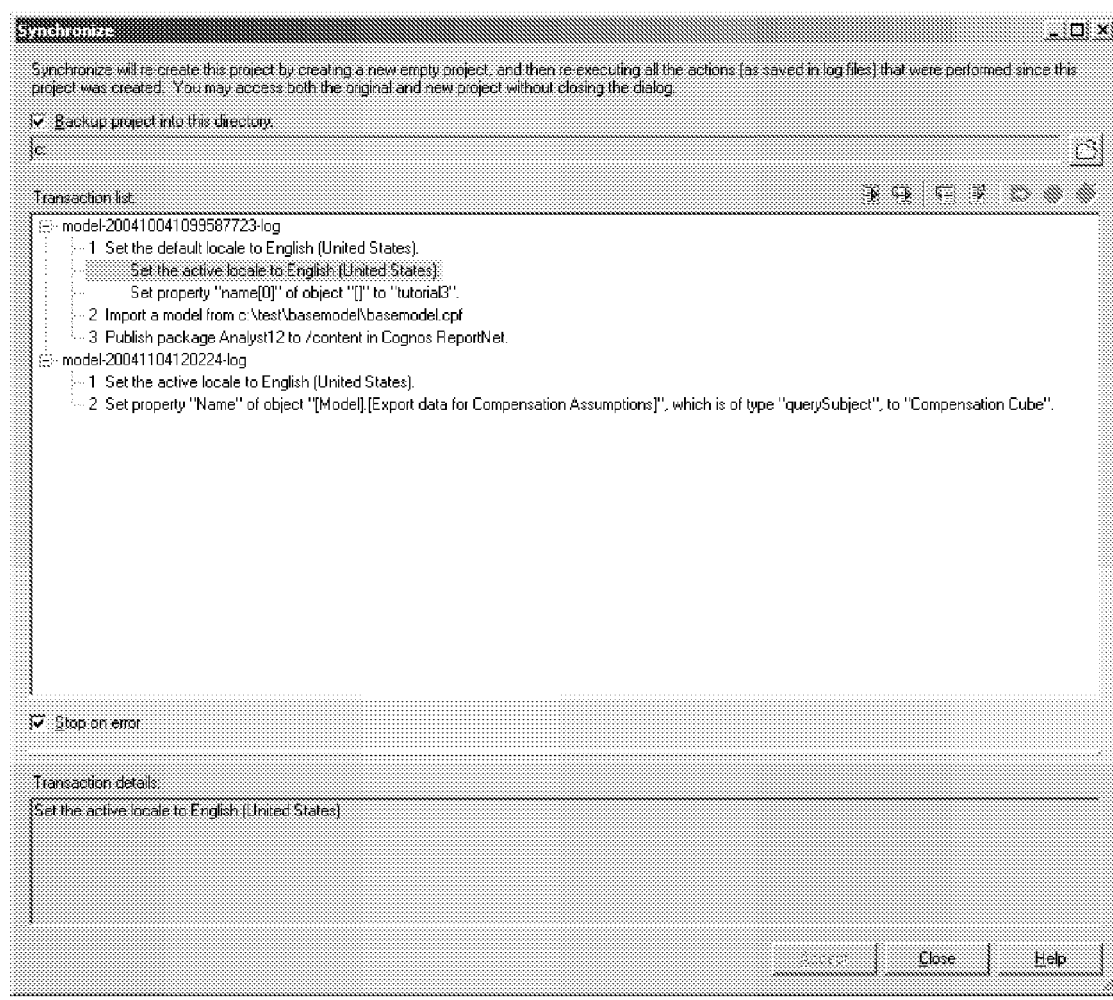
FIG. 21 is a screen illustration of another example user interface of the model generator.

FIG. 21 is a screen illustration of an example user interface 220 of model generator 32 by which user 12A initiates a synchronization process after changing database schema 36 to recreate user reporting model 38 based on activity log 22. As illustrated, user interface 212 provides a list of activity logs selectable by the users. For each activity log, user interface 212 lists the particular modifications that have been recorded and the order in which the modifications occurred. In this manner, user 12A is able to view the modifications that would be "re-applied" after the synchronization of the user reporting model 38 with the base reporting model 40.

Various embodiments of the invention have been described. Although described in reference to an enterprise planning system, such as an enterprise financial or budget planning system, the techniques may be readily applied to other software systems, including other large-scale enterprise software systems. Examples of other enterprise software systems include order management systems, inventory management systems, sales force management systems, business intelligent tools, enterprise reporting tools, project and resource management systems and other enterprise software systems. Moreover, the techniques may be implemented on any type of computing device, including servers, client computers, laptops or other devices. These and other embodiments are within the scope of the following claims.

The invention claimed is:
1. A computer-implemented system comprising:
a computer-readable medium storing a schema generator, a publish module, a model generator, and a reporting tool in the form of software instructions; and
a processor executing the schema generator to automatically produce a relational database schema for a relational database based on an organization of multidimensional data within a data cube of a multidimensional database,
wherein the processor executes the publish module to store the multidimensional data of the data cube within the relational database in accordance with the relational database schema produced by the schema generator,
wherein the processor executes the model generator to automatically produce a reporting model based on the relational database schema produced by the schema generator,
wherein, for a subsequent publication of the multidimensional data of the multidimensional database, the processor executes the schema generator to update the relational database schema based on the organization of the multidimensional data within the data cube,
wherein, in response to updating the relational database schema, the processor executes the model generator to regenerate the reporting model, and wherein the processor executes the reporting tool to output a report to present the multidimensional data in accordance with the regenerated reporting model.

2. The system of claim 1,
wherein the processor executes the model generator to produce the reporting model as a base reporting model based on the relational database schema,
wherein the processor executes the model generator to produce a user reporting model by importing the base reporting model and updating the user reporting model in response to modifications of the base reporting model, and
wherein the processor executes the reporting tool to output the report in accordance with the user reporting model.

3. The system of claim 2, further comprising an activity log maintained by the model generator to record the requested modifications to the base reporting model to produce the user reporting model,
wherein the processor executes the model generator to generate a new base reporting model in response to changes to the relational database schema, and
wherein, after generating the new base reporting model in response to the changes to the relational database schema, the processor executes the model generator to reapply the modifications from the activity log to the new base reporting model to automatically generate a new user reporting model that is based on the new base reporting model and that is synchronized to include the user modifications used to produce the previous user reporting model.

4. The system of claim 1,
wherein the processor executes the model generator to present a user interface listing a plurality of relational database schemas maintained within the relational database, and
wherein the processor executes the model generator to receive input selecting one or more of the listed relational database schemas for inclusion in generating the reporting model.

5. The system of claim 4, wherein the processor executes the model generator to present the user interface to include an input mechanism to allow a selection of one or more different database views for each data cube described by the multidimensional data.

6. The system of claim 1, wherein the processor executes the model generator to generate a first set of definitions in the reporting model that describe relational tables of the relational database schema, and a second set of definitions that describe relationships between the tables.

7. The system of claim 1,
wherein the relational database schema comprises a set of one or more star schemas having one or more central fact tables and one or more dimension tables linked to the fact tables,
wherein the processor executes the model generator to produce the reporting model based on the star schemas,
wherein the fact tables contain data that describes one or more data cubes and corresponding measures of the multidimensional data, and
wherein each of the dimension tables contain data that describes dimensions of the data cubes.

8. A computer-implemented method comprising:
producing, by a processor, a relational database schema for a relational database based on an organization of multidimensional data within a data cube of a multidimensional database;
storing the multidimensional data from the data cube in a relational database in accordance with the relational database schema;
automatically generating a reporting model based on the relational database schema;
for a subsequent publication of the multidimensional data of the multidimensional database, updating the relational database schema by the processor based on the organization of the multidimensional data within the data cube, and, in response to updating the relational database schema, regenerating the reporting model; and
outputting a report to present the multidimensional data stored within the relational database in accordance with the regenerated reporting model.

9. The method of claim 8, wherein automatically generating the reporting model comprises:
generating a base reporting model based on the relational database schema;
generating a user reporting model by importing the base reporting model; and
updating the user reporting model in response to modifications of the base reporting model previously requested.

10. The method of claim 9, further comprising maintaining an activity log to record the requested modifications to the base reporting model to produce the user reporting model.

11. The method of claim 10, further comprising:
generating a new base reporting model to include new definitions in response to changes to the relational database schema;
synchronizing the user reporting model to use the new definitions from the new base reporting model; and
reapplying the modifications from the activity log to the user reporting model to generate a new user reporting model.

12. The method of claim 8, further comprising:
presenting a user interface listing a plurality of database schemas maintained within the relational database; and
receiving input selecting one or more of the listed database schemas for inclusion in generating the reporting model.

13. The method of claim 12, further comprising presenting the user interface to include an input mechanism to allow a selection of dimension information for use in generating the reporting model.

14. The method of claim 12, further comprising presenting the user interface to include an input mechanism to allow a selection of one or more different database views for each data cube described by the multidimensional data.

15. The method of claim 8, further comprising:
storing metadata within the relational database schema that defines data types and formats for measures within the multidimensional data;
modifying the metadata stored within the relational database schema based on user input; and
regenerating the reporting model from the modified database schema.

16. The method of claim 8, wherein the reporting model comprises a plurality of extensible markup language (XML) files.

17. The method of claim 8, wherein generating the reporting model comprises:
generating a first set of definitions in the reporting model that describe relational tables of the relational database schema; and
generating a second set of definitions that describe relationships between the tables.

18. The method of claim 8,
wherein the relational database schema comprises a set of one or more star schemas having one or more central fact tables and one or more dimension tables linked to the fact tables, and
wherein generating the reporting model comprises generating the reporting model based on the star schemas.

19. The method of claim 18,
wherein the fact tables contain data that describes one or more data cubes and corresponding measures of the multidimensional data, and
wherein each of the dimension tables contain data that describes dimensions of the data cubes.

20. A non-transitory computer-readable medium comprising instructions to cause a programmable processor to:
produce a relational database schema for a relational database based on an organization of multidimensional data within a data cube of a multidimensional database;
store the multidimensional data from the data cube in a relational database in accordance with the relational database schema;
automatically generate a reporting model based on the relational database schema;
for a subsequent publication of the multidimensional data of the multidimensional database, update the relational database schema based on the organization of the multidimensional data within the data cube, and, in response to updating the relational database schema, regenerating the reporting model; and
output a report to present the multidimensional data stored within the relational database in accordance with the regenerated reporting model.

* * * * *